(12) United States Patent
Yang et al.

(10) Patent No.: US 10,210,097 B2
(45) Date of Patent: Feb. 19, 2019

(54) MEMORY SYSTEM AND METHOD FOR OPERATING THE SAME

(71) Applicant: Macronix International Co., Ltd., Hsinchu (TW)

(72) Inventors: Tzu-Yi Yang, Hsinchu (TW); Ting-Yu Liu, Hsinchu (TW); Yi-Chun Liu, Zhubei (TW)

(73) Assignee: Macronix International Co., Ltd., Hsinchu (TW)

( * ) Notice: Subject to any disclaimer, the term of this patent is extended or adjusted under 35 U.S.C. 154(b) by 157 days.

(21) Appl. No.: 15/375,545

(22) Filed: Dec. 12, 2016

(65) Prior Publication Data

US 2018/0165219 A1 Jun. 14, 2018

(51) Int. Cl.
*G06F 12/121* (2016.01)
*G06F 3/06* (2006.01)

(52) U.S. Cl.
CPC .......... *G06F 12/121* (2013.01); *G06F 3/065* (2013.01); *G06F 3/068* (2013.01); *G06F 3/0619* (2013.01); *G06F 2212/69* (2013.01)

(58) Field of Classification Search
None
See application file for complete search history.

(56) References Cited

U.S. PATENT DOCUMENTS

| 7,316,010 | B1 | 1/2008 | Daynes et al. |
| 7,752,617 | B2 | 7/2010 | Blinick et al. |
| 9,158,546 | B1 | 10/2015 | Smith |
| 9,323,542 | B2 | 4/2016 | Ratn et al. |
| 2009/0210615 | A1* | 8/2009 | Struk ............ G06F 12/123 711/104 |
| 2016/0117229 | A1 | 4/2016 | Epstein |

OTHER PUBLICATIONS

U.S. Appl. No. 14/838,949, filed Oct. 1, 2015, Liu.

* cited by examiner

*Primary Examiner* — Tuan V Thai
(74) *Attorney, Agent, or Firm* — Fish & Richardson P.C.

(57) ABSTRACT

A request is received to load a particular overlay segment from a secondary storage memory to a main memory for execution by a processor, wherein the particular overlay segment is absent from the main memory. A determination is made whether the main memory can receive the particular overlay segment. In response to determining that the main memory cannot receive the particular overlay segment, eviction strategy information about one or more existing overlay segments that are present in the main memory is obtained. Based on the eviction strategy information, at least one of the one or more existing overlay segments is selected for eviction from the main memory. The particular overlay segment is retrieved from the secondary storage memory. The at least one of the one or more existing overlay segments in the main memory that is selected for eviction is replaced with the particular overlay segment.

18 Claims, 8 Drawing Sheets

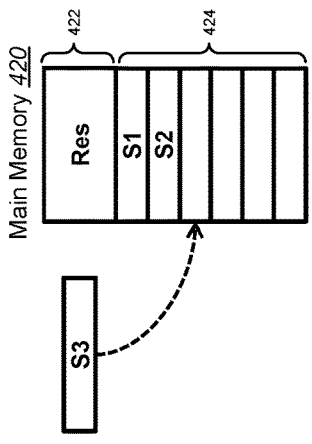
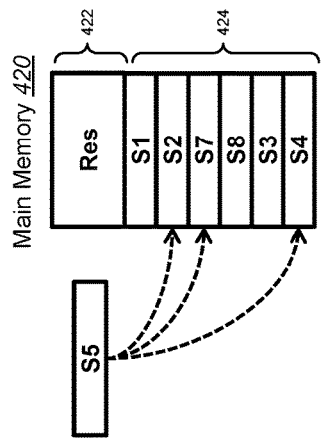
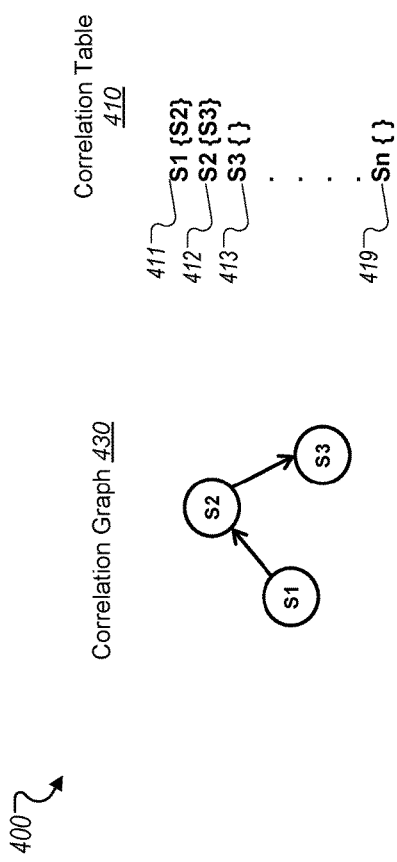
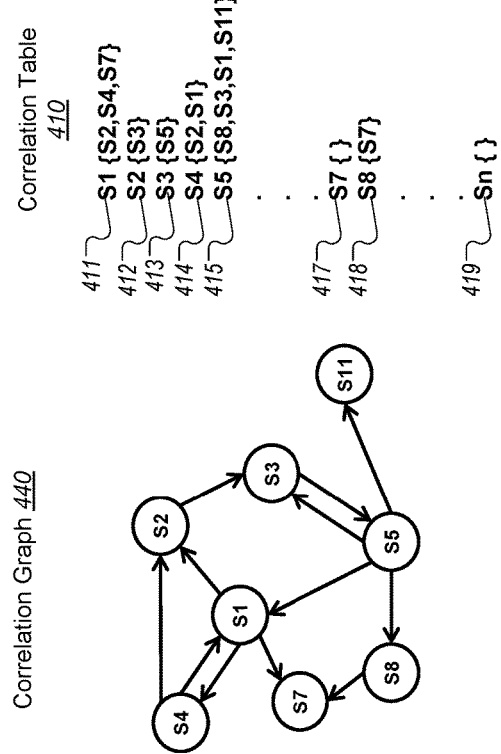
Figure 4A
Figure 4B

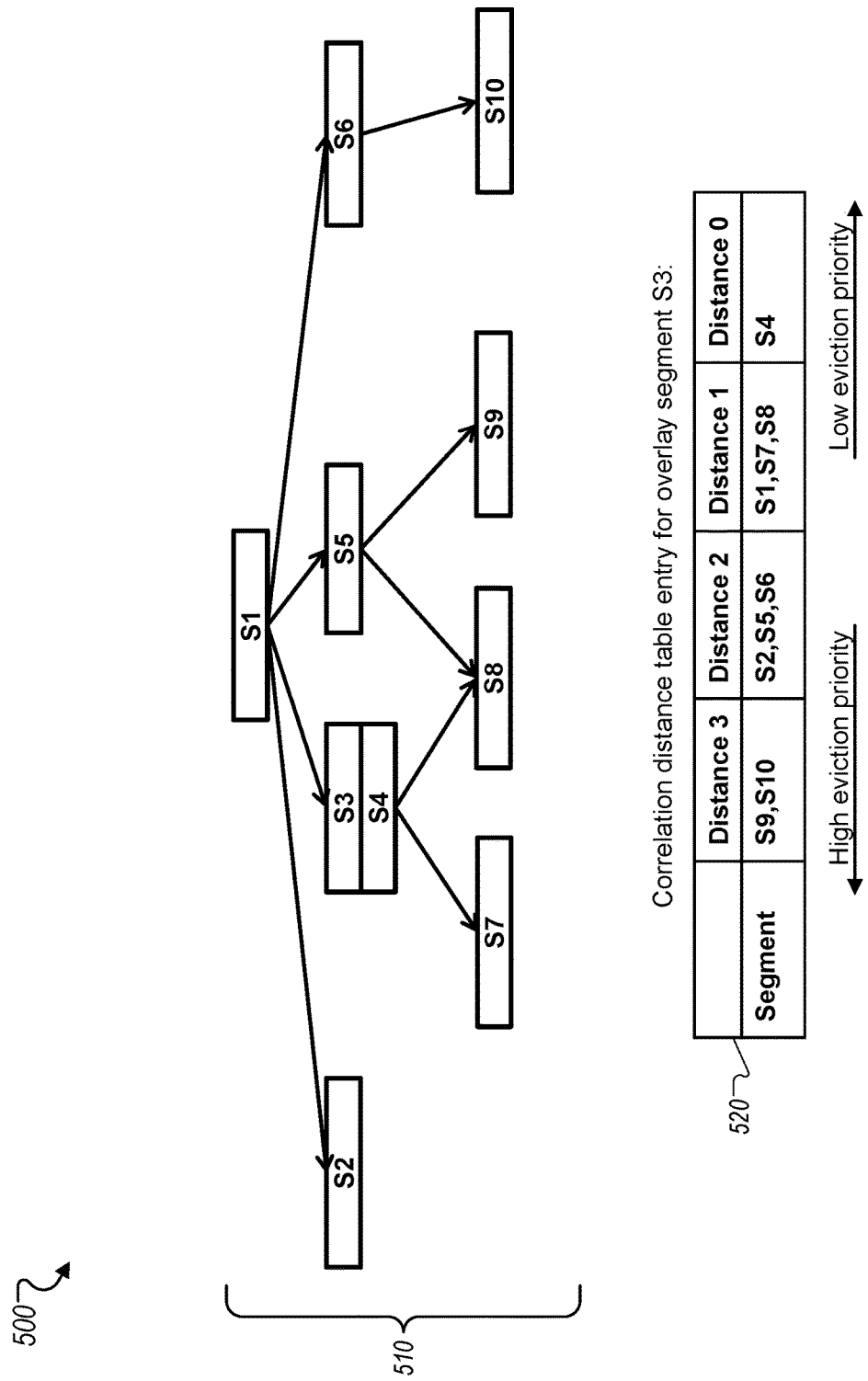

MEMORY SYSTEM AND METHOD FOR OPERATING THE SAME

BACKGROUND

In some devices, program code or data is divided into segments called overlays or overlay segments. One or more of the overlay segments are copied from secondary storage into main memory as needed during device runtime.

SUMMARY

The present disclosure describes systems and techniques to manage loading and unloading of overlay segments from the main memory of a device. In some implementations, the main memory of a device, e.g., the cache memory in a memory controller associated with a storage device, is smaller in size compared to the size of the program code or data sought by the processor during runtime. In such cases, the full program code, e.g., device firmware, and/or data are stored in a larger secondary storage memory, e.g., flash storage memory. The program code or data are divided into blocks called overlay segments. When one or more overlay segments are sought by the device processor, the device processor loads the requested overlay segments into the main memory from the secondary storage memory. In loading the requested overlay segments, the device controller uses the functionality of an overlay manager, which refers to one or more program routines that are configured to manage the loading and unloading of overlay segments from the main memory. The device controller, or more specifically the processor corresponding to the device controller, executes the one or more program routines to implement the services of the overlay manager.

When space is not available in the main memory to load overlay segments sought by the processor, the overlay manager, or more specifically the device controller using the overlay manager service, applies one or more eviction strategies to select existing overlay segments, which are present in the main memory, for eviction, to make space available for a requested overlay segment.

In some implementations, the overlay manager applies an eviction strategy in which an existing overlay segment is evicted from the main memory based on load frequency. In such cases, if the load frequency of an overlay segment is high, the corresponding eviction priority is low.

In some implementations, the overlay manager applies an eviction strategy in which correlation between overlay segments are recorded at run time. In such cases, the overlay manager determines that two or more overlay segments is correlated based on whether the overlay segments are loaded within a preselected time period of one other. When loading a requested overlay segment into the main memory, the overlay manager evicts an existing overlay segment that has the least correlation with the overlay segment to be loaded.

In some implementations, the overlay manager applies an eviction strategy in which the overlay manager accesses a correlation data structure, e.g., an overlay segment correlation tree generated at compile time of a program code. When loading a requested overlay segment into the main memory, the overlay manager evicts, based on the information in the correlation data structure, an existing overlay segment that has the least correlation with the overlay segment to be loaded.

In some implementations, the overlay manager applies an eviction strategy in which the overlay manager monitors a current task scenario executed by the processor and accesses a scenario table. The scenario table, which is generated at compile time of the program code, provides an association of one or more overlay segments of the program code with different task scenarios. When loading a requested overlay segment into the main memory, the overlay manager evicts from the main memory an existing overlay segment that is not associated with the current task scenario.

In some implementations, the overlay manager uses multiple eviction strategies, e.g. two or more of the eviction strategies outlined above, simultaneously. In such cases, the overlay manager determines a priority for evicting one or more existing overlay segments from the main memory by combining the individual results of the different eviction strategies. In some implementations, the overlay manager computes a weighted combination of the individual results to determine the eviction priority of the existing overlay segments.

In a general aspect, a request is received to load a particular overlay segment from a secondary storage memory to a main memory for execution by a processor, wherein the particular overlay segment is absent from the main memory. A determination is made whether the main memory can receive the particular overlay segment. In response to determining that the main memory cannot receive the particular overlay segment, eviction strategy information about one or more existing overlay segments that are present in the main memory is obtained. Based on the eviction strategy information about the one or more existing overlay segments, at least one of the one or more existing overlay segments is selected for eviction from the main memory. The particular overlay segment is retrieved from the secondary storage memory. The at least one of the one or more existing overlay segments in the main memory that is selected is replaced with the particular overlay segment.

Particular implementations may include one or more of the following features. Obtaining eviction strategy information about the one or more existing overlay segments may comprise determining a load frequency of overlay segments into the main memory. For each of the one or more existing overlay segments, a load time instant at which the respective existing overlay segment was loaded into main memory from the secondary storage memory at an instance preceding the most recent instance of loading the respective existing overlay segment into the main memory, may be stored, wherein the respective overlay segment is loaded into main memory at least twice. A request time instant at which the request to load the particular overlay segment is received may be stored. In response to determining that the main memory cannot accept the particular overlay segment, for each of the one or more existing overlay segments, a difference between the load time instant corresponding to the respective existing overlay segment and the request time instant may be computed and the load frequency may be determined as inversely proportional to the difference. An existing overlay segment of the one or more existing overlay segments with the lowest load frequency may be identified. The existing overlay segment with the lowest load frequency may be selected for eviction from the main memory.

Obtaining eviction strategy information about the one or more existing overlay segments may comprise maintaining correlation data for overlay segments as they are loaded into the main memory. A first entry for a first overlay segment in a correlation data structure may be obtained at a time the first overlay segment is loaded into the main memory from the secondary storage memory. The correlation data structure may include one or more entries for one or more overlay segments. One or more other overlay segments that are correlated to the first overlay segment may be determined. In response to the determination, the one or more other overlay segments may be linked to the first entry.

In response to determining that the main memory cannot accept the particular overlay segment, the correlation data structure may be accessed. A determination may be made whether a target entry corresponding to the particular overlay segment exists in the correlation data structure. Conditioned on determining that the target entry corresponding to the particular overlay segment exists in the correlation data structure, the target entry may be examined to identify one or more overlay segments that are correlated with the particular overlay segment. Based on identifying one or more overlay segments that are correlated with the particular overlay segment, an existing overlay segment present in the main memory that is not correlated with the particular overlay segment may be determined. In response to determining an existing overlay segment that is not correlated with the particular overlay segment, the existing overlay segment may be selected for eviction from the main memory.

Determining one or more other overlay segments that are correlated to the first overlay segment may comprise identifying a second overlay segment that is loaded into the main memory from the secondary storage memory within a preselected time period following loading the first overlay segment into the main memory from the secondary storage memory. Based on identifying the second overlay segment that is loaded within the preselected time period following loading the first overlay segment, the second overlay segment may be correlated to the first overlay segment.

Obtaining eviction strategy information about the one or more existing overlay segments may comprise obtaining correlation data for a plurality of overlay segments present in the secondary storage memory. A correlation data structure may be obtained from the secondary storage memory, the correlation data structure indicating correlations among the plurality of overlay segments. Based on the correlation data structure, correlation distances between the particular overlay segment and one or more other overlay segments in the correlation data structure may be computed. Upon computing the correlation distances, an overlay segment with the largest correlation distance among the one or more existing overlay segments present in the main memory may be identified. The identified overlay segment may be selected for eviction from the main memory.

The correlation data structure may include a correlation tree that is generated for the plurality of overlay segments at compile time of a program corresponding to the plurality of overlay segments.

Obtaining eviction strategy information about the one or more existing overlay segments may comprise obtaining scenario data for a plurality of overlay segments present in the secondary storage memory. A scenario data structure may be obtained from the secondary storage memory. The scenario data structure may identify task scenarios included in a program corresponding to the plurality of overlay segments and associations of the plurality of overlay segments with the task scenarios. A particular task scenario associated with the particular overlay segment may be determined. An existing overlay segment present in the main memory that is not associated with the particular task scenario may be identified. The identified existing overlay segment may be selected for eviction from the main memory.

The task scenarios may include one or more of a write scenario, a read scenario, an erase scenario and a don't-care scenario for the program. The scenario data structure may be generated for the plurality of overlay segments at compile time of the program.

Obtaining eviction strategy information about the one or more existing overlay segments may comprise obtaining at least a first eviction strategy information and a second eviction strategy information about the one or more existing overlay segments. A first weight may be associated with the first eviction strategy information. A second weight may be associated with the second eviction strategy information. A first group of the one or more existing overlay segments may be identified for eviction based on the first eviction strategy information. The first group may be weighed using the first weight. A second group of the one or more existing overlay segments may be identified for eviction based on the second eviction strategy information. The second group may be weighed using the second weight. An eviction priority order for the one or more existing overlay segments may be computed based on a combination of the weighted first group and the weighted second group. An existing overlay segment may be selected for eviction from the main memory based on the eviction priority order.

Determining whether the main memory can receive the particular overlay segment may comprise determining whether the main memory is full. A prediction may be made about a next overlay segment that will be executed by the processor, based on the eviction strategy information about the one or more existing overlay segments.

In another general aspect, a memory system comprises a secondary storage memory that is configured to store a plurality of overlay segments; a main memory that is configured to store, for execution by a processor at run time, one or more overlay segments obtained from the plurality of overlay segments stored in the secondary storage memory; and an overlay manager. The overlay manager receives a request to load a particular overlay segment from the secondary storage memory to the main memory for execution by the processor, wherein the particular overlay segment is absent from the main memory. The overlay manager determines whether the main memory can receive the particular overlay segment. In response to determining that the main memory cannot receive the particular overlay segment, the overlay manager obtains eviction strategy information about one or more existing overlay segments that are present in the main memory. Based on the eviction strategy information about the one or more existing overlay segments, the overlay manager selects at least one of the one or more existing overlay segments for eviction from the main memory. The overlay manager retrieves the particular overlay segment from the secondary storage memory. The overlay manager replaces the selected at least one of the one or more existing overlay segments in the main memory with the particular overlay segment.

Particular implementations may include one or more of the following features. Obtaining eviction strategy information about the one or more existing overlay segments may comprise determining a load frequency of overlay segments into the main memory. The overlay manager may be configured to store, for each of the one or more existing overlay segments, a load time instant at which the respective existing overlay segment was loaded into main memory from the secondary storage memory at an instance preceding the most recent instance of loading the respective existing overlay segment into the main memory, wherein the respective overlay segment is loaded into main memory at least twice.

The overlay manager may store a request time instant at which the request to load the particular overlay segment is received. In response to determining that the main memory cannot accept the particular overlay segment, the overlay manager may, for each of the one or more existing overlay segments, compute a difference between the load time instant corresponding to the respective existing overlay segment and the request time instant, and determine the load frequency as inversely proportional to the difference. The overlay manager may identify an existing overlay segment of the one or more existing overlay segments with the lowest load frequency. The overlay manager may select the existing overlay segment with the lowest load frequency for eviction from the main memory.

Obtaining eviction strategy information about the one or more existing overlay segments may comprise maintaining correlation data for overlay segments as they are loaded into the main memory. The overlay manager may be configured to generate a first entry for a first overlay segment in a correlation data structure at a time the first overlay segment is loaded into the main memory from the secondary storage memory, wherein the correlation data structure includes one or more entries for one or more overlay segments. The overlay manager may determine one or more other overlay segments that are correlated to the first overlay segment. In response to the determination, the overlay manager may link the one or more other overlay segments to the first entry.

The overlay manager may be further configured to access the correlation data structure in response to determining that the main memory cannot accept the particular overlay segment. The overlay manager may determine whether a target entry corresponding to the particular overlay segment exists in the correlation data structure. Conditioned on determining that the target entry corresponding to the particular overlay segment exists in the correlation data structure, the overlay manager may examine the target entry to identify one or more overlay segments that are correlated with the particular overlay segment. Based on identifying one or more overlay segments that are correlated with the particular overlay segment, the overlay manager may determine an existing overlay segment present in the main memory that is not correlated with the particular overlay segment. In response to determining an existing overlay segment that is not correlated with the particular overlay segment, the overlay manager may select the existing overlay segment for eviction from the main memory.

Determining one or more other overlay segments that are correlated to the first overlay segment may comprise identifying a second overlay segment that is loaded into the main memory from the secondary storage memory within a preselected time period following loading the first overlay segment into the main memory from the secondary storage memory. Based on identifying the second overlay segment that is loaded within the preselected time period following loading the first overlay segment, the overlay manager may correlate the second overlay segment to the first overlay segment.

Obtaining eviction strategy information about the one or more existing overlay segments may comprise obtaining correlation data for a plurality of overlay segments present in the secondary storage memory. The overlay manager may be configured to obtain, from the secondary storage memory, a correlation data structure indicating correlations among the plurality of overlay segments. The overlay manager may compute, based on the correlation data structure, correlation distances between the particular overlay segment and one or more other overlay segments in the correlation data structure. Upon computing the correlation distances, the overlay manager may identify an overlay segment with the largest correlation distance among the one or more existing overlay segments present in the main memory. The overlay manager may select the identified overlay segment for eviction from the main memory.

Obtaining eviction strategy information about the one or more existing overlay segments may comprise obtaining scenario data for a plurality of overlay segments present in the secondary storage memory. The overlay manager may be configured to obtain, from the secondary storage memory, a scenario data structure identifying task scenarios included in a program corresponding to the plurality of overlay segments and associations of the plurality of overlay segments with the task scenarios. The overlay manager may determine a particular task scenario associated with the particular overlay segment. The overlay manager may identify an existing overlay segment present in the main memory that is not associated with the particular task scenario. The overlay manager may select the identified existing overlay segment for eviction from the main memory.

Obtaining eviction strategy information about the one or more existing overlay segments may comprise obtaining at least a first eviction strategy information and a second eviction strategy information about the one or more existing overlay segments. The overlay manager may be configured to associate a first weight with the first eviction strategy information and a second weight with the second eviction strategy information. The overlay manager may identify a first group of the one or more existing overlay segments for eviction based on the first eviction strategy information. The overlay manager may weight the first group using the first weight. The overlay manager may identify a second group of the one or more existing overlay segments for eviction based on the second eviction strategy information. The overlay manager may weight the second group using the second weight. The overlay manager may compute an eviction priority order for the one or more existing overlay segments based on a combination of the weighted first group and the weighted second group. The overlay manager may select an existing overlay segment for eviction from the main memory based on the eviction priority order.

Determining whether the main memory can receive the particular overlay segment may comprise determining whether the main memory is full. A size of an overlay segment may correspond to a size of an address transfer hardware unit.

Implementations of the above techniques include methods, systems, computer program products and computer-readable media. One such computer program product is suitably embodied in a non-transitory machine-readable medium that stores instructions executable by one or more processors. The instructions are configured to cause the one or more processors to perform the above-described actions. One such computer-readable medium stores instructions that, when executed by one or more processors, are configured to cause the one or more processors to perform the above described actions.

In the manner described above, the overlay manager can efficiently determine existing overlay segments for eviction from the main memory by using dynamic eviction information or static eviction information, or a combination of both. The dynamic and/or static eviction information are used to identify existing overlay segments that are not likely to be used in the near term by the processor. This is useful to improve the speed of execution of program code, and/or processing of data, by the processor.

In some implementations, the eviction information is used to predict the next overlay segment that is likely to be requested by the processor. By loading the predicted next overlay segment into the main memory in advance such that the overlay segment is already available for access by the processor when the request is made, such prediction can improve device operation.

The techniques can be applied to various types of non-volatile memory arrays, such as NAND flash memory or NOR flash memory, among others. Additionally or alternatively, the techniques can be applied to various types of devices and systems, such as embedded systems, among others.

The details of one or more disclosed implementations are set forth in the accompanying drawings and the description below. Other features, aspects, and advantages will become apparent from the description, the drawings and the claims.

BRIEF DESCRIPTION OF THE DRAWINGS

FIGS. 4A and 4B illustrate an example of an eviction strategy based on correlating overlay segments at run time, according to one or more implementations.

FIG. 5 illustrates an example of an eviction strategy based on generating a correlation data structure of overlay segments at compile time, according to one or more implementations.

DETAILED DESCRIPTION

Program code or data are loaded into the executable or main memory of an electronic device for execution by a processor of the electronic device. The program code or data that is processed by a processor associated with the device can be larger than the capacity of the main capacity. In some cases, the program code or data are divided into overlay segments for loading into the main memory. In this context, overlaying is a technique in which programs or data larger than a computer's main memory are loaded into the main memory in smaller overlay segments for execution by the processor.

For example, in some flash memory storage devices, such as memory cards, there is no operating system or memory management unit to handle virtual memory. Instead, overlay management techniques are utilized. The operating software of a flash memory storage device, also referred to as the device firmware, is divided into program segments called firmware overlay segments. An overlay manager loads firmware overlay segments into the main memory when the overlay segments are sought by the processor. Each firmware overlay segment that is loaded into the main memory may overwrite an existing overlay segment in the main memory.

Figure 1:
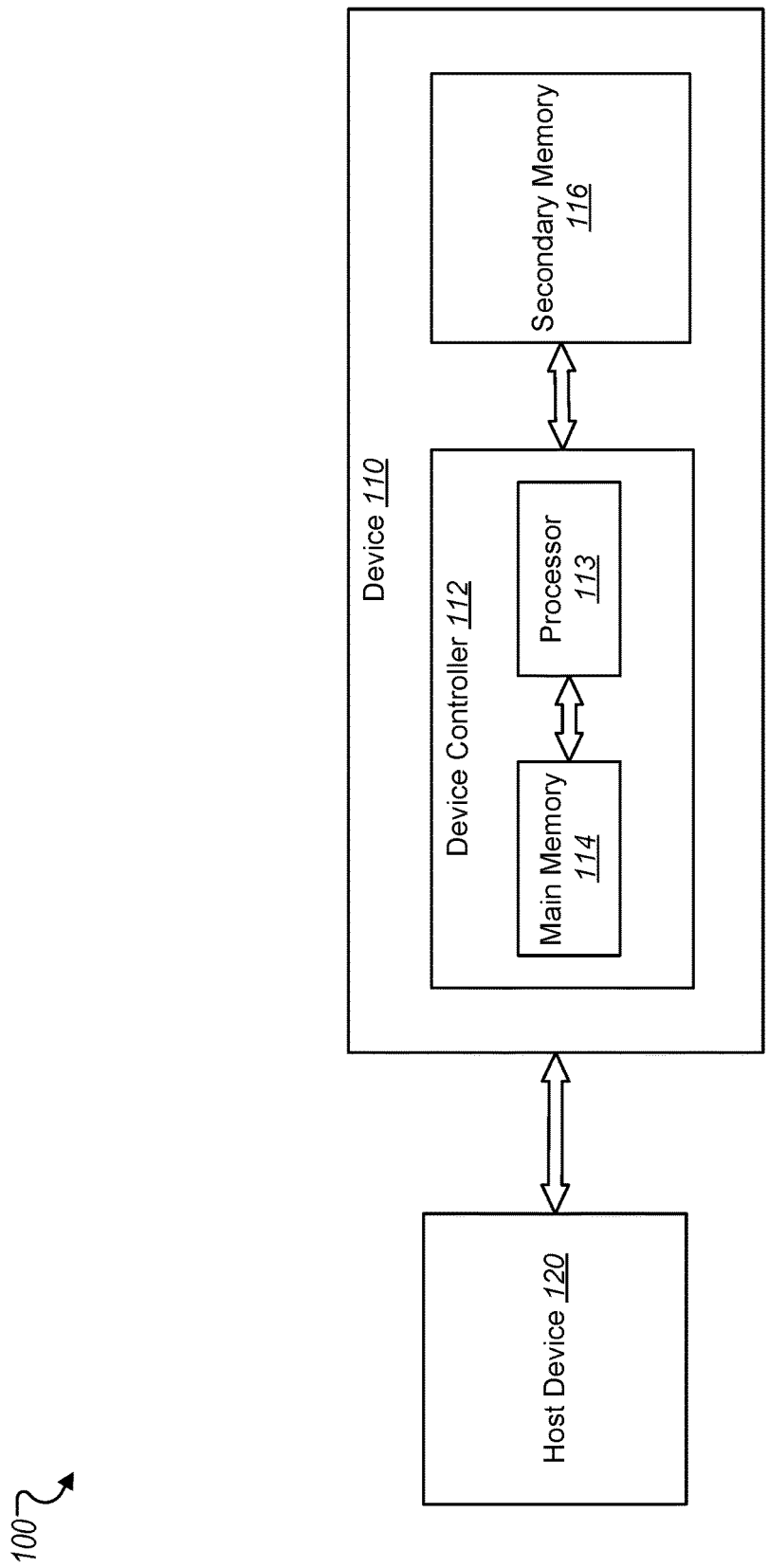
FIG. 1 illustrates an example of a system for using overlay segments, according to one or more implementations.

FIG. 1 illustrates an example of a system 100 for using overlay segments, according to one or more implementations. The system 100 includes a device 110 and a host device 120. The device 110 includes a device controller 112 and a secondary memory 116. The device controller includes a processor 113 and a main memory 114.

In some implementations, the device 110 is a storage device. For example, the device 110 can be an embedded multimedia card (eMMC), a secure digital (SD) card, or some other suitable storage. In some implementations, the device 110 is a smart watch, a digital camera or a media player. In some implementations, the device 110 is a client device that is coupled to a host device 120. For example, the device 110 is an SD card into a digital camera or a media player that is the host device 120.

The device controller 112 is a general-purpose microprocessor, or an application-specific microcontroller. In some implementations, the device controller 112 is a memory controller for the device 110. The following sections describe the various techniques based on implementations in which the device controller 112 is a memory controller. However, the techniques described in the following sections are also applicable in implementations in which the device controller 112 is another type of controller that is different from a memory controller.

The processor 113 is configured to execute instructions and process data. The instructions include firmware instructions and/or other program instructions that are stored as firmware code and/or other program code, respectively, in the secondary memory. The data includes program data corresponding to the firmware and/or other programs executed by the processor, among other suitable data. In some implementations, the processor 113 is a general-purpose microprocessor, or an application-specific microcontroller. The processor 113 is also referred to as a central processing unit (CPU).

The processor 113 accesses instructions and data from the main memory 114. In some implementations, the main memory 114 is a Static Random Access Memory (SRAM) or a Dynamic Random Access Memory (DRAM). For example, in some implementations, when the device 110 is an eMMC, an SD card or a smart watch, the main memory 114 is an SRAM. In some implementations, when the device 110 is a digital camera or a media player, the main memory 114 is DRAM.

In some implementations, the main memory is a cache memory that is included in the device controller 112, as shown in FIG. 1. The main memory 114 stores instruction code, which correspond to the instructions executed by the processor 113, and/or the data that are requested by the processor 113 during runtime.

The device controller 112 transfers the instruction code and/or the data from the secondary memory 116 to the main memory 114. In some implementations, the secondary memory 116, also referred to as secondary storage, is a non-volatile memory that is configured for long-term storage of instructions and/or data, e.g., a NAND flash memory device or a NOR flash memory device, or some other suitable non-volatile memory device. In implementations where the secondary memory 116 is NAND flash memory, the device 110 is a flash memory device, e.g., a flash memory card, and the device controller 112 is a NAND flash controller. In some implementations, the secondary memory 116 is a magnetic disc drive or an optical drive. For example, in some implementations, when the device 110 is an eMMC or an SD card, the secondary memory 116 is a NAND flash; in some implementations, when the device 110 is a smart watch, the secondary memory 116 is a NOR flash; in some implementations, when the device 110 is a digital camera, the main memory 116 is an SD card; and in some implementations, when the device 110 is a media player, the main memory 116 is a hard disk.

In some implementations, the main memory 114 is faster than the secondary memory 116, but the main memory 114 is smaller in size compared to the secondary memory 116. In some cases, the capacity of the main memory 114 is insufficient to hold the entire program code and/or the data corresponding to the instructions and data that are processed by the processor 113. For example, in some cases the capacity of the main memory 114 is in the order of 48 kilobytes (kB), the size of the firmware code is in the order of 128 kB, and the capacity of the secondary memory is in the order of 4 gigabytes (GB). Accordingly, an entire executable program code and/or the full set of data are stored in the secondary memory 116. A smaller portion of the executable program and/or the data, which are recently or frequently accessed by the processor 113, are stored in the main memory 114, which has higher access speed, to reduce access time. The smaller portion of the executable program and/or the data that are stored in the main memory 114 are based on the smaller capacity of the main memory 114.

The device controller 112 is configured to load the portions of the executable program or the data that are accessed by the processor 113 from the secondary memory 116 to the main memory 114. In some implementations, the executable program and/or the data are divided into overlay segments, and all the overlay segments are stored in the secondary memory 116. Each program overlay segment includes code corresponding to one or more functions that are executed by the processor 113. The device controller 112 loads one or more program overlay segments and/or data overlay segment into the main memory 114 as they are requested by the 113.

If the requested overlay segment exists in the main memory 114 (also referred to as a "hit"), the processor 113 accesses the overlay segment from the main memory and processes the corresponding function or the data. If the requested overlay segment does not exist in the main memory 114 (also referred to as a "miss"), then the device controller 112 copies the requested overlay segment from the secondary memory 116 to the main memory 114, from where the overlay segment is subsequently accessed by the processor 113.

In some implementations, the programmer divides the program code and/or the data into the overlay segments that are stored in the secondary memory 116. In addition, one or more program routines in the firmware code are generated for performing the functions of an overlay manager. During system runtime, the program routines are executed by the processor 113 to implement the overlay manager. In some implementations, when the device 110 is powered on, the processor 113 executes one or more functions from a read-only memory (ROM) to initialize the device 110. As part of the initialization, the processor 113 loads the overlay manager program routines from the secondary memory 116 to a resident portion of the main memory 114, which is described in the following sections. The processor 113 executes some initial function to initialize the overlay manager service.

Once the overlay manager is initialized, overlay segments are loaded, using the overlay manager, from the secondary memory 116 into the main memory 114 when sought by the processor 113. The overlay manager copies the requested overlay segment to a physical overlay ram slot and updates a table of an address transfer HW, and records which overlay segment is in use at any one time. The overlay manager runs throughout the operation of the device 110, and is called whenever overlay loading is needed. For instance, the overlay manager can be called before every function call which might require a different overlay segment to be loaded. In the following sections, the various operations are described as being performed by the overlay manager. It is to be understood that these refer to the processor 113 in the device controller 112 performing the operations based on executing the program routines corresponding to the overlay manager service.

Figure 2:
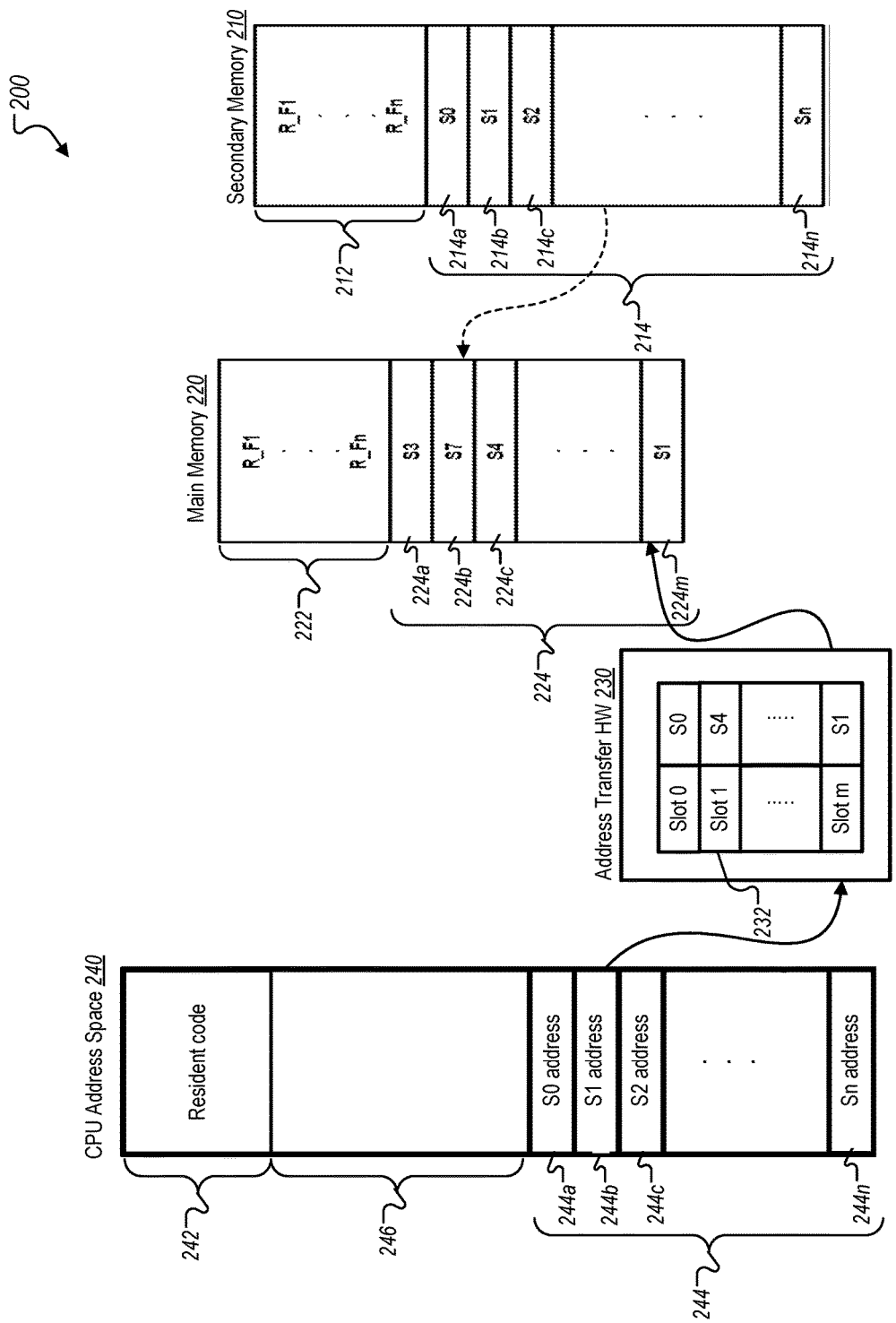
FIG. 2 illustrates an example of a mechanism for transferring overlay segments between a secondary memory and a main memory of a device using an address transfer HW mechanism between a CPU address space and the main memory.

FIG. 2 illustrates an example of a mechanism 200 for transferring overlay segments between a secondary memory 210 and a main memory 220 of a device using an address transfer HW 230 mechanism between a CPU address space 240 and the main memory 220. In some implementations, the secondary memory 210 and the main memory 220 correspond to the system 100. For example, the secondary memory 210 is similar to the secondary memory 116, and the main memory 220 is similar to the main memory 114.

The secondary memory 210 includes a resident section 212 and an overlay section 214. In some implementations, the main memory 220 is a SRAM, and the main memory 220 includes a resident RAM portion 222 and an overlay RAM portion 224. In some implementations, overlay segments are transferred between the secondary memory 210 and the main memory 220. An address transfer HW 230 sends a request to the overlay manager when a miss happens, to load the corresponding overlay segment from secondary memory overlay section 214 to overlay RAM 224, as described in greater detail in the following sections.

The memory addresses that are accessed by the processor 113 is given by the CPU address space 240. The addresses in the CPU address space 240 can be grouped into several categories, e.g., a resident code address space 242, a virtual overlay RAM address space 244, and an address space 246 for other uses.

The resident section 212 in the secondary memory 210 stores program code for functions, e.g., R_F1, R_Fn, among others, that are used for managing the overlay segments, and other critical functions of the processor, in addition to critical data. These program code and/or data are loaded and stored in the main memory 220 in the resident RAM 222. Functions that are stored in the resident RAM 222, referred to as resident functions, are not evicted from the resident RAM 222 during runtime. For example, as shown, R_F1 and R_Fn are resident functions. The resident functions include functions for the overlay manager implementing the overlay loader service, and/or an interrupt service, apart from other frequently used functions. In some implementations, decision is made at compile time about which functions should be resident functions that are to be stored in the resident RAM 222 during runtime.

The overlay section 214 in the secondary memory 210 stores all the overlay segments, e.g., S0, S1, S2 and Sn, among others, corresponding to the program code and/or data that are divided into overlay segments. The overlay segments are stored at different memory address locations in the overlay section 214, e.g., S0 is stored at memory address location 214a, S1 is stored at memory address location 214b, S2 is stored at memory address location 214c, and Sn is stored at memory address location 214n. As described above, the overlay manager routines are loaded into the resident RAM 222 during initialization. During device runtime, the overlay manager service is used, to load one or more of the overlay segments from the secondary memory 210 into the main memory 220, and are stored in the overlay RAM 224 in overlay slots, e.g., slots 224a, 224b, 224c and 224m. As an illustrative example, FIG. 2 shows that overlay segments S3, S7, S4 and S1, among others, are loaded into the overlay RAM 224 and stored in slots 224a, 224b, 224c and 224m respectively. Overlay slots 224a, 224b and 224m correspond to slot 0, slot 1 and slot m in an address transfer table 232 included in the address transfer HW 230, described in greater detail below.

The arrangement of the overlay segments in the overlay RAM 224 or the overlay section 214 is transparent to the processor 113. The processor 113 reads from or writes to memory addresses in the CPU address space 240. When accessing overlay segments, foreground operations, e.g., higher-level instructions executed by the processor 113, consider that the entire overlay code exists in virtual overlay RAM address space 244. The address transfer HW 230 is used to redirect an address accessed in the virtual overlay RAM space 224 to the physical overlay RAM space 224 in the main memory. The number n of locations, e.g., 214a, 214b, 214c and 214n, in the overlay section 214 of the secondary memory 210, or the corresponding virtual addresses, e.g., 244a, 244b, 244c or 244n, in the virtual overlay RAM address space 244, is greater than the number m of overlay slots, e.g., slots 224a, 224b, 224c and 224m, in the overlay RAM 224 (e.g., m<n, where m and n are integers >0). For example, in some implementations, the processor 113 is a 32-bit processor with a 4 GB CPU address space 240. The resident functions are 16 kB in total; the resident section 212, the resident RAM 222 and the resident code address space 242 are each 16 kB. For 128 kB overlay code, the virtual overlay RAM space 244 and the overlay section 214 are each 128 kB in size. The physical overlay RAM 224, in contrast, is 32 kB in size. In such cases, the physical overlay RAM 224 stores a subset of the overlay segments, totaling 32 kB of the overall 128 kB of the overlay code.

Accordingly in the above cases, when the processor 113 attempts to access an overlay segment by its address in the virtual overlay RAM address space 244, the target overlay segment may or may not be present in the physical overlay RAM 224. As described below, the address transfer HW 230, working in conjunction with the overlay manager service, makes the target overlay segment available in the physical overlay RAM 224, in a manner that is transparent to the foreground operations of the processor 113.

The address transfer HW 230 monitors the virtual overlay address that is accessed by the processor in the virtual overlay RAM space 244, e.g., one of virtual addresses 244a, 244b, 244c or 244n. If the accessed address corresponds to a target overlay segment that is present in the overlay RAM 224 (referred to as an address hit), the address transfer HW will redirect the accessed address in the virtual address space 244 to an overlay slot in the physical address space 224 that stores the target overlay segment.

On the other hand, if the address transfer HW 230 determines that the target overlay segment is not present in the overlay RAM 224 (referred to as an address miss), then an interrupt is triggered. When the interrupt is triggered, the processor enters an interrupt state; the processor stops execution of the present operations, and jumps to execution of the code corresponding to the overlay manager service. Using the eviction strategies described herein, the overlay manager loads the target overlay segment from the corresponding location in the overlay section 214 to an overlay slot in the overlay RAM 224. The overlay manager also updates the address transfer table 232 in the address transfer HW 230, as described below. Once the overlay segment is loaded into a slot in the overlay RAM 224 and the address transfer table 232 is updated, the interrupt is cleared. Subsequently, the processor resumes normal operation and returns to execution of the foreground operations that had been paused by the interrupt, including accessing the target overlay segment from the physical overlay RAM 224.

The address transfer table 232 included in the address transfer HW 230 records locations of overlay segments that are loaded into the main memory 220. In some implementations, the address transfer table 232 includes m entries that correspond to the m overlay slots present in the overlay RAM 224. For example, the address transfer table 232 includes entries for slot 0, slot 1 and slot m, which correspond to the overlay slots 224a, 224b and 224m respectively. When the processor 113 reads from or writes to an address in the virtual overlay space 244 (e.g., one of address locations 244a, 244b, 244c or 244n), the address transfer HW 230 searches the entries in the address transfer table 232 (e.g., slot 0, slot 1 or slot m) to determine whether the target overlay segment that is associated with the virtual overlay address accessed by the processor is present in the physical overlay RAM space (e.g., in one of slots 224a, 224b, 224c or 224m in the overlay RAM 224). If the address transfer table 232 indicates that the target overlay segment is present in an overlay slot in the physical overlay RAM 224 (an address hit), the address transfer HW 230 transfers the processor read/write address to the identified overlay slot in the overlay RAM section (e.g., to one of slots 224a, 224b, 224c or 224m).

On the other hand, if the address transfer HW 230 does not find an entry in the address transfer table for the target overlay segment (an address miss), the address transfer HW 230 triggers an interrupt to load the target overlay segment from its memory location in the overlay section 214 in the secondary memory (e.g., one of the memory address locations 214a, 214b, 214c or 214n) to an overlay slot in the overlay RAM 224 (e.g., one of slots 224a, 224b, 224c or 224m), as described above. Following loading the target overlay segment into the overlay RAM 224, the overlay manager updates the address transfer table 232, e.g., by updating an entry corresponding to the overlay slot where the overlay segment is just loaded. The overlay manager utilizes one or more of the eviction strategies described in the following sections to determine an overlay slot where the overlay segment is to be loaded. Once the overlay segment loading operation is complete, the interrupt is cleared. The generation of the interrupt and loading the overlay segment from the secondary memory 210 to the main memory 220 is transparent to the foreground operations performed by the processor 113.

In some implementations, the size of an overlay segment is equal the size of an address transfer HW unit. For example, as noted above, in some implementations, the overlay RAM 224 is in the order of 32 kB in size. The size of the address transfer unit of the address transfer HW 230 is in the order of 1 kB. In such cases, each overlay segment, and each corresponding overlay slot in the overlay RAM 224, have size in the order of 1 kB.

As discussed above and indicated by FIG. 2, the number of overlay segments that are loaded into the overlay RAM 224 is less than the total number of overlay segments that are stored in the overlay section 214 of the secondary memory 210. In some implementations, when the processor, e.g., processor 113, requests one or more overlay segments that are not present in the overlay RAM 224 (an address miss), the overlay manager has to evict one or more existing overlay segments from the overlay RAM 224 to make space available to load the requested overlay segments. This can be the case, for example, when all the available space in the overlay RAM 224 is occupied by overlay segments that were previously loaded into the main memory 220. In such cases, the overlay manager uses one or more of the eviction strategies that are described in the following sections. By using the overlay manager service implementing one or more of the eviction strategies described below, a device processor, e.g., processor 113 in the device controller 112, can evict existing overlay segments efficiently from the main memory to make space available to load the requested overlay segments.

By implementing these techniques, the overlay manager ensures that overlay segments that are less likely to be requested by the processor are evicted earlier, while overlay segments that are more likely to be requested by the processor remain in the main memory. Since the time to load overlay segments into the main memory on a miss causes a finite delay in execution by the processor, by identifying existing overlay segments in the main memory that are more likely to be requested by the processor, such that these remain in the main memory, the overlay manager improves the processing speed of the device, e.g., the device 110 in the system 100.

In the following sections, the eviction strategies are discussed in the context of code overlay segments, e.g., overlay segments corresponding to firmware code. However, the eviction strategies are equally applicable to overlay segments corresponding to other forms of program code, and overlay segments corresponding to data, among others. In case of data overlay segments, an overlay segment has to be flushed into the secondary memory before eviction from the main memory. This is the case, for example, when the data included in the overlay segment has changed since being loaded into main memory.

Figure 3:
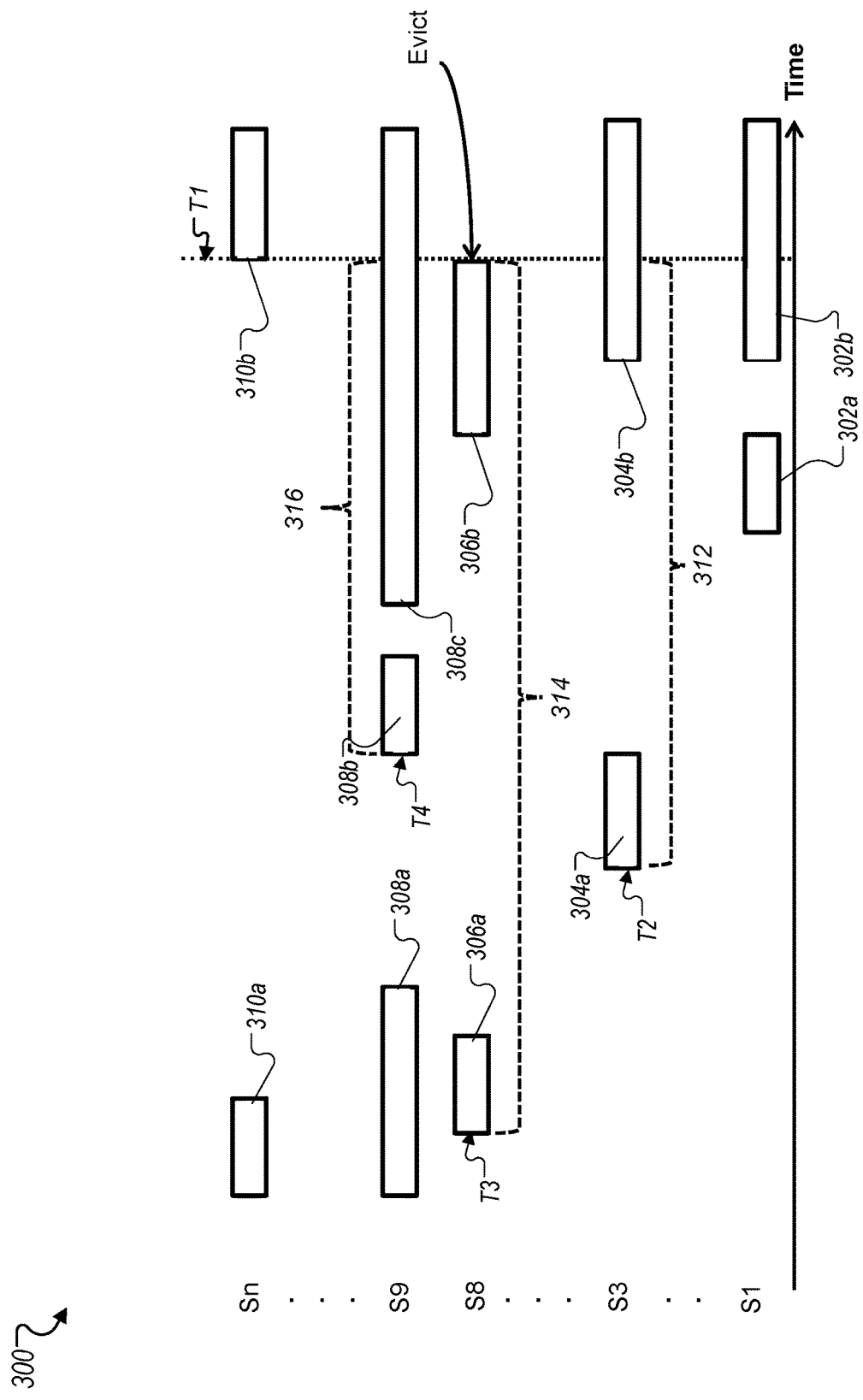
FIG. 3 illustrates an example of an eviction strategy based on load frequency of overlay segments, according to one or more implementations.

FIG. 3 illustrates an example of an eviction strategy 300 based on load frequency of overlay segments, according to one or more implementations. In some implementations, the eviction strategy 300 is used by the overlay manager in the system 100. For example, the processor 113 uses the overlay manager service during runtime to determine one or more overlay segments to evict from the main memory 114, to make space available to load one or more overlay segments corresponding to program code for functions requested by the processor 113 from the secondary memory 116 to the main memory 114. Accordingly, the following sections describe the eviction strategy 300 with respect to the system 100. However, the eviction strategy 300 also can be implemented by other systems and devices.

In some implementations, an overlay segment is loaded from the secondary memory into the main memory multiple times. For example, an overlay segment is loaded when requested by the processor; later it is removed (e.g., using one of the strategies described below) when no longer being used by the processor; subsequently it is loaded again when requested by the processor again, and so on. The eviction strategy 300 is depicted in FIG. 3 by showing different time periods during which different overlay segments are present in the main memory 114. For example, overlay segment S1 is loaded into the main memory 114 during time periods 302a and 302b; overlay segment S3 is loaded into the main memory 114 during time periods 304a and 304b; overlay segment S8 is loaded into the main memory 114 during time periods 306a and 306b; overlay segment S9 is loaded into the main memory 114 during time periods 308a, 308b and 308c; and overlay segment Sn is loaded into the main memory 114 during time periods 310a and 310b.

FIG. 3 shows that at time instant T1, overlay segments S1, S3, S8 and S9 are present in the main memory 114, while overlay segment Sn, which was previously loaded during time period 310a, is not present in the main memory 114. The processor 113 requests access to program code that corresponds to the overlay segment Sn at time instant T1. Upon receiving the processor request, the address transfer HW 230 determines that the overlay segment Sn is not present in the main memory 114 (e.g., by performing a lookup of the address transfer table 232), and triggers an interrupt. Upon triggering the interrupt, the processor executes the overlay manager routines to load the overlay segment Sn from the secondary memory 116 to the main memory 114.

While attempting to load the overlay segment Sn into the main memory 114, the overlay manager determines that the overlay RAM of the main memory, e.g., the overlay RAM 224, is full—all available spaces in the overlay RAM are occupied by existing overlay segments. In response to the determination, the overlay manager identifies an overlay segment that can be evicted from the main memory 114 using the load frequency eviction strategy 300. In some implementations, for each existing overlay segment in the main memory, the overlay manager determines when the overlay segment was last loaded into the main memory 114 before the most recent instance of loading into the main memory. The overlay manager computes, as the load frequency, the time elapsed from a time instant at which the corresponding overlay segment was last loaded into the main memory 114 before the most recent loading instance to the present time instant, e.g., T1. For example, the overlay segment S3 was most recently loaded into the main memory during time period 304b, and the previous instance was during time period 304a. Accordingly, the overlay manager computes the load frequency of S3 as corresponding inversely to the time duration 312, which is the time elapsed from the time instant T2 at which S3 was loaded into the main memory during the previous instance 304a, to the present time instant T1.

Similarly, the most recent instance of loading the overlay segment S8 is given by time duration 306b, while the preceding instance is given by time duration 306a, when it was loaded into main memory at time instant T3. The load frequency of S8 accordingly corresponds inversely to the time duration 314, which is the time elapsed from T3 to the present instant T1. The overlay segment S9 is loaded most recently during time duration 308c, with the preceding loading instance being during time duration 308b, when overlay segment S9 was loaded at time instant T4. The load frequency of S9 accordingly corresponds inversely to the time duration 316, which is the time elapsed from T4 to the present instant T1.

The overlay manager records the load frequencies of the different overlay segments in the main memory 114. In some implementations, the overlay manager maintains a data structure, such as a table or an array, in the main memory 114, e.g., in the resident RAM of the main memory, in which the computed load frequencies of the overlay segments are recorded. In some implementations, the data structure includes the load frequencies of overlay segments corresponding to the firmware code, including overlay segments that are not present in the main memory 11.

In some implementations, the overlay manager accesses, from the stored records, the load frequencies of the existing overlay segments present in the main memory 114. The overlay manager compares the load frequencies of the existing overlay segments to identify an overlay segment that has the lowest load frequency, e.g., the overlay segment for which the time elapsed since the time the overlay segment was last loaded into the main memory 114, before the most recent instance, to the present time instant is the longest. The overlay manager evicts the overlay segment that has the lowest load frequency. For example, as shown by the example of FIG. 3, overlay segment S8 has the lowest load frequency, since the time duration 314 is the longest of the time durations 312, 314 and 316 and the load frequency is inversely proportional to the time duration. Accordingly, the overlay manager selects the overlay segment S8 for eviction from the main memory 114 at time instant T1, to make space available to load the requested overlay segment Sn.

Accordingly, using the load frequency eviction strategy as described above, the overlay manager dynamically determines eviction priorities of overlay segments based on how frequently the overlay segments are requested by the processor 113. Overlay segments with low load frequencies are requested less often by the processor 113, and are less likely to be requested by the processor 113 in the near future. The overlay manager therefore evicts overlay segments with the lowest load frequencies.

In some implementations, the overlay manager selects for eviction an overlay segment that has a different load frequency, e.g., the second lowest load frequency or the highest load frequency. For example, as shown, overlay segment S3 has the second lowest load frequency, while overlay segment S1 has the highest load frequency. In some implementations, the overlay manager selects S3 for eviction, while in some other implementations, the overlay manager selects S1 for eviction.

As described above, the eviction strategy 300 can determine the load frequency of an overlay segment based on the overlay segment having been loaded at least two times into the main memory. For example, as shown in FIG. 3, overlay segment S1 is loaded into the main memory 114 twice—during time periods 302a and 302b; overlay segment S3 is loaded twice—during time periods 304a and 304b; overlay segment S8 is loaded twice—during time periods 306a and 306b; overlay segment S9 is loaded three times—during time periods 308a, 308b and 308c; and overlay segment Sn is loaded twice—during time periods 310a and 310b. The eviction strategy 300 computes the load frequency for an overlay segment based on the time period that has elapsed between at least two successive loadings of the overlay segment. Accordingly in some cases, the eviction strategy 300 is also referred to as "load N times" load frequency eviction strategy, where N is an integer and N≥2.

FIGS. 4A and 4B illustrate an example of an eviction strategy 400 based on correlating overlay segments at run time, according to one or more implementations. In some implementations, the eviction strategy 400 is used by the overlay manager in the system 100. For example, the processor 113 uses the overlay manager service during runtime to determine one or more overlay segments to evict from the main memory 114, to make space available to load one or more overlay segments corresponding to program code for functions requested by the processor 113 from the secondary memory 116 to the main memory 114. Accordingly, the following sections describe the eviction strategy 400 with respect to the system 100. However, the eviction strategy 400 also can be implemented by other systems and devices.

In the eviction strategy 400, the overlay manager records the correlation of overlay segments at run time by monitoring when overlay segments are loaded into the main memory 114. If two overlay segments are loaded into the main memory 114 within a preselected time period of one another, then the overlay manager records that these two segments are correlated. When making space available in the main memory 114 to load a requested overlay segment, the overlay manager evicts an existing overlay segment that is not correlated with the overlay segment to be loaded.

FIGS. 4A and 4B illustrate how the overlay manager builds a correlation table 410 for the eviction strategy 400, and uses the correlation table to identify existing overlay segments in the main memory 420 for eviction. In some implementations, the main memory 420 is similar to the main memory 114. The main memory 420 includes a resident RAM 422 and an overlay RAM 424. In some implementations, the resident RAM 422 is similar to the resident RAM 222 and the overlay RAM 424 is similar to the overlay RAM 224.

In some implementations, the correlation table 410 is a suitable data structure, e.g., an array, that is stored in the main memory 420. In some cases, the correlation table 410 is stored in the resident RAM section 422. Additionally or alternatively, the correlation table can be stored in secondary storage memory, e.g., secondary memory 116.

The correlation table 410 includes an entry for each overlay segment of the firmware code. For example, if the firmware code has n (n being an integer greater than zero) overlay segments S1, S2, S3, up to Sn, the correlation table includes n entries for the n overlay segments, e.g., 411, 412, 413 and 419 respectively, as shown in FIG. 4A. Some of the entries can be empty, e.g., the entry 419 for overlay segment Sn. This can be the case, for example, when there are no other overlay segments that are correlated with Sn, or when the correlation of overlay segments with Sn has not been determined yet.

In some implementations, the correlation table has a smaller size and stores entries for a subset of the overall number of overlay segments of the firmware code. In such cases, if the correlation table is full, the overlay manager evicts one or more overlay segment entries from the correlation table to make space for new overlay segment entries. The overlay manager uses one or more strategies to evict overlay segment entries from the correlation table. For example, the overlay manager can evict the oldest entry first.

FIGS. 4A and 4B show the implementation of the eviction strategy 400 at two different instances. The correlation graph 430 of FIG. 4A indicates that overlay segment S1 is initially loaded into a slot in the main memory 420, followed by overlay segment S2, which is followed by overlay segment S3. When loading the overlay segment S2 into main memory 420 subsequent to loading S1, the overlay manager checks whether S2 is loaded within a preselected time period following loading S1. For example, in some implementations, the preselected time period is 10 milliseconds (ms), or some other suitable value, and the overlay manager checks whether overlay segment S2, and/or other overlay segments, are loaded within 10 ms following loading overlay segment S1 into the main memory 420. In the example shown, the overlay manager determines that overlay segment S2 is loaded within the preselected time period following loading overlay segment S1. Accordingly, the overlay manager correlates overlay segment S2 with overlay segment S1 by recording overlay segment S2 in the entry 411 for overlay segment S1 in the correlation table 410.

In the implementation example shown in FIG. 4A, considering overlay segment S3, the overlay manager determines that overlay segment S3 is loaded within the preselected time period following loading overlay segment S2 (e.g., within 10 ms of loading overlay segment S2) into the main memory 420, but beyond the preselected time period following loading overlay segment S1 (e.g., more than 10 ms after loading overlay segment S1). Accordingly, the overlay manager correlates overlay segment S3 with overlay segment S2 by recording overlay segment S3 in the entry 412 for overlay segment S2 in the correlation table 410. However, the overlay manager determines that overlay segment S3 is not correlated with overlay segment S1 and hence does not record overlay segment S3 in the overlay segment S1 entry 411 in the correlation table 410.

In some implementations, the preselected time period is a system parameter that is stored in non-volatile memory, e.g., secondary memory 116. During run time, the preselected time period is loaded into the main memory 420 for ready access by the overlay manager. For example, the preselected time period can be loaded in the main memory 420 and stored in the resident RAM 422 during run time. In some implementations, the value of the preselected time period can be set by a programmer or system designer. In some implementations, the value of the preselected time period can be dynamically updated, e.g., by the programmer through a user interface, or by the overlay manager itself.

FIG. 4B provides a snapshot of the correlation table 410 and the main memory 420 at a different instant in time. The correlation graph 440 in FIG. 4B indicates that overlay segments S2, S4 and S7 are correlated with overlay segment S1, e.g., because overlay segments S2, S4 and S7 were loaded into main memory 420 with the preselected time period following loading overlay segment S1 into the main memory 420. The correlation graph 440 further indicates that overlay segment S3 is correlated with overlay segment S2; overlay segments S1 and S2 are correlated with overlay segment S4; overlay segment S5 is correlated with overlay segment S3; overlay segments S1, S3, S8 and S11 are correlated with overlay segment S5; and overlay segment S7 is correlated with overlay segment S8.

The correlation graphs 430 and 440 are provided for illustrative purposes only, to aid in the understanding of how the overlay manager populates entries in the correlation table 410 when loading overlay segments into the main memory 420. However, in some implementations, one or more data structures corresponding to the correlation graphs 430 and/or 440 are maintained in memory, e.g., in the main memory 420, and/or the secondary storage memory, such as secondary memory 116.

The correlations between the overlay segments indicated in the correlation graph 440 are recorded in the correlation table 410 by the overlay manager in the manner described above with respect to FIG. 4A. Accordingly, the overlay manager: records overlay segments S2, S4 and S7 in the correlation table entry 411 for the overlay segment S1; records overlay segment S3 in the correlation table entry 412 for the overlay segment S2; records overlay segment S5 in the correlation table entry 413 for the overlay segment S3; record overlay segments S2 and S1 in the correlation table entry 414 for the overlay segment S4; records overlay segments S8, S3, S1 and S11 in the correlation table entry 415 for the overlay segment S5; and records overlay segment S7 in the correlation table entry 418 for the overlay segment S8.

The empty entries 417 and 419 for overlay segments S7 and Sn respectively indicate that no other overlay segments are correlated with overlay segments S7 and Sn. In some implementations, the correlated overlay segments are recorded in an entry in the order in which they are loaded. For example, the entry 414 for overlay segment S4 indicates that, subsequent to loading overlay segment S4 into the main memory 420, overlay segment S2 is loaded into the main memory 420 with the preselected time period after loading overlay segment S4, followed by loading overlay segment S1 into the main memory 420 with the preselected time period after loading overlay segment S4.

In some implementations, the entries for overlay segments in the correlation table 410 can change with time. For example, when overlay segment S1 is loaded into the main memory 420 at the time instance represented by FIG. 4A, overlay segment S2 is correlated with overlay segment S1, as indicated by the correlation table 411 for overlay segment S1 in FIG. 4A. Subsequently, in some implementations, overlay segment S1 was evicted from the correlation table. At a subsequent time instant overlay segment S1 is again loaded into the main memory 420. Overlay segments S2, S4 and S7 are also loaded into the main memory 420 with the preselected time period after loading overlay segment S1 and they are therefore correlated with overlay segment S1, as indicated by the correlation graph 440. Accordingly, the correlation table entry 411 for overlay segment S1 is now rewritten with records for overlay segments S2, S4 and S4, reflecting the most recent instance of loading S1 into the main memory 420 that is indicated by the time instant of FIG. 4B.

In some implementations, the overlay manager uses the information in the correlation table 410 to select one or more existing overlay segments to evict from the main memory 420 when space is to be made available to load a requested overlay segment from the secondary memory into the main memory. Describing the eviction strategy with respect to the example shown in FIG. 4B, the correlation table entry 415 for overlay segment S5 was created at a prior instance when overlay segment S5 was loaded into the main memory 420, followed by loading overlay segments S8, S3, S1 and S11 into the main memory within the preselected time period after S5. Subsequently, S5 was evicted from the main memory 420 at another prior time instance. In the present time instance represented by FIG. 4B, the processor (e.g., processor 113) has again requested program code that corresponds to overlay segment S5.

Upon receiving the processor request, the address transfer HW 230 determines, by accessing the address transfer table, that the overlay segment S5 is not present in the main memory and has to be loaded from the secondary memory to the main memory (an address miss). After the address transfer HW 230 triggers the interrupt and the processor executes the overlay manager routines, the overlay manager determines that the overlay RAM 424 of the main memory 420 is full. Accordingly, to load S5 from the secondary memory to the main memory, the overlay manager has to evict another existing overlay segment from the main memory 420. To select an existing overlay segment for eviction, the overlay manager consults the correlation table 410. By examining the correlation table entry 415 for overlay segment S5, the overlay manager determines which overlay segments are correlated with overlay segment S5. Since these are overlay segments that are correlated with the presently requested overlay segment, the processor is likely to request these correlated overlay segments soon. The overlay manager therefore attempts not to evict any of these correlated overlay segments. Instead, the overlay manager checks whether there are one or more existing overlay segments in the main memory 420 that are not correlated with overlay segment S5. The overlay manager selects one of these non-correlated overlay segments for eviction to make space available in the main memory 420 for overlay segment S5.

Accordingly, in the example of FIG. 4B, the overlay manager determines from the correlation table 415 that overlay segments S8, S3, S1 and S11 are correlated with overlay segment S5. By examining the overlay section 424 of the main memory, the overlay manager identifies existing overlay segments S2, S7 and S4 as non-correlated with overlay segment S5. The overlay manager selects one of overlay segments S2, S7 and S4 for eviction to make space available to load overlay segment S5.

In some implementations, the overlay manager randomly selects one of overlay segments S2, S7 and S4 for eviction. In some implementations, the overlay manager applies another eviction strategy, e.g., the load frequency eviction strategy described previously, to select one of overlay segments S2, S7 and S4 for eviction. In some implementations, the overlay manager applies a combination of eviction strategies, as described in the following sections, to select one of overlay segments S2, S7 and S4 for eviction.

In some implementations, a requested overlay segment that is to be loaded does not have any correlated overlay segments. In such cases, any of the existing overlay segments in the main memory 420 can be selected for eviction. For example, the empty correlation table entry 419 for overlay segment Sn indicates that there are no other overlay segments correlated with overlay segment Sn. Accordingly, to load overlay segment Sn into the main memory 420, any of the existing overlay segments S1, S2, S7, S8, S3 or S4 can be evicted from the main memory 420.

When all the existing overlay segments in the main memory 420 are correlated with the requested overlay segment that is to be loaded, then in some implementations the overlay manager randomly selects one the existing overlay segments for eviction. Alternatively, the overlay manager applies another eviction strategy, e.g., the load frequency eviction strategy or a combination of strategies as described in the following sections, to select one of the existing overlay segments for eviction.

The eviction strategy 300 or the eviction strategy 400 are dynamic eviction strategies. In each of the eviction strategies 300 or 400, the overlay manager obtains eviction strategy information during run time, e.g., the load frequencies of overlay segments or the correlations between overlay segments depending on when they are loaded into main memory. Additionally or alternatively, in some implementations, the overlay manager uses static eviction strategies, as described in the following sections with respect to FIGS. 5 and 6. In the static eviction strategies, the information are determined before run time, e.g., by the programmer while writing the firmware code or at compile time of the firmware code.

FIG. 5 illustrates an example of an eviction strategy 500 based on generating a correlation data structure of overlay segments at compile time, according to one or more implementations. In some implementations, the eviction strategy 500 is used by the overlay manager in the system 100. For example, the processor 113 uses the overlay manager service to determine, based on the eviction strategy 500, one or more overlay segments to evict from the main memory 114 to make space available to load, from the secondary memory 116 to the main memory 114, one or more overlay segments corresponding to program code for functions requested by the processor 113. Accordingly, the following sections describe the eviction strategy 500 with respect to the system 100. However, the eviction strategy 500 also can be implemented by other systems and devices.

In some implementations, the correlation data structure is a correlation tree 510. In other implementations, other forms of correlation data structures are used, such as an array. The correlation tree 510 provides information about correlations between overlay segments that are determined at compile time, e.g., by a programmer of the firmware code. The programmer divides the firmware code into overlay segments, each of which includes one or more functions. The dependencies between the functions in the overlay segments can be represented in a tree-like graph. Based on the dependencies between the functions in the overlay segments, the programmer determines the dependencies, or correlations, between the corresponding overlay segments, which is indicated by the correlation tree 510. Additionally or alternatively, the programmer creates a correlation distance table 520 to include the correlation information among the overlay segments that are determined using the correlation tree 510.

The correlation tree 510 and the correlation distance table 520 use a correlation distance metric to represent the correlations between the overlay segments. As shown in the example of FIG. 5, overlay segment S1 is directly correlated with overlay segments S2, S3, S5 and S6, which indicate that the functions included in segment S2, S3, S5 and S6 may be called directly by the functions included in segment S1. Accordingly, when the overlay segment S1 is requested by the processor 113 (e.g., a function that is included in the overlay segment S1 is called by the processor 113), it is highly likely that one or more of the overlay segments S2, S3, S5 or S6 will be requested by the processor (e.g., one or more functions included in the overlay segments S3, S5 or S6 will also be called by the processor 113). The correlation distance, or simply distance, from overlay segment S1 to any of overlay segments S2, S3, S5 or S6 is set to be distance 1.

Considering the correlation tree 510 from the perspective of the overlay segment S3, the correlation tree 510 also shows that overlay segments S3 and S4 are used together, e.g., when overlay segment S3 is requested by the processor, then overlay segment S4 will definitely also be requested. The distance between overlay segments S3 and S4 is set to be distance 0. Overlay segment S3 is also directly correlated with overlay segments S7 and S8, indicating that when overlay segment S3 is called, it is highly likely that one or more of the overlay segments S7 or S8 will be requested by the processor. The distance from overlay segment S3 to overlay segments S7 and S8 are therefore set to be distance 1.

The correlation tree 510 indicates that overlay segments S2, S5 and S6 are not directly correlated with overlay segment S3. Instead, overlay segments S2, S5 and S6 are correlated with overlay segment S3 through overlay segment S1, which is at distance 1 from S3. Accordingly, the distance of overlay segments S2, S5 and S6 from overlay segment S3 is set to distance 2. In this manner, overlay segments S9 and S10 are correlated to overlay segment S3 respectively through overlay segments S5 and S6 that are at distance 2 from overlay segment S3. Accordingly, the distance of overlay segments S9 and S10 from overlay segment S3 is set to distance 3.

The correlation distance table 520 shows an example entry for overlay segment S3, which records the correlation distances of the other overlay segments from overlay segment S3 that are determined based on the correlation tree 510 as described above. As shown, with respect to overlay segment S3, overlay segment S4 is at distance 0; overlay segments S1, S7 and S8 are at distance 1; overlay segments S2, S5 and S6 are at distance 2; and overlay segments S9 and S10 are at distance 3. Overlay segments with greater distance values will have higher eviction priority compared to overlay segments with lower distance values. For example, as shown by the correlation distance table 520, overlay segments S9 and S10 with correlation distance 3 will have higher eviction priority compared to overlay segments S2, S5 or S6 with correlation distance 2. In contrast, overlay segment S4 with correlation distance 0 will have lower eviction priority compared to overlay segments S1, S7 or S8 with correlation distance 1.

Different overlay segments will have different correlation distance tables. In some implementations, the overlay manager can dynamically generate, during runtime, correlation distance tables for different overlay segments from the correlation tree 510.

The above description indicates that stronger the correlation between two overlay segments, lower is the distance metric between these overlay segments. Conversely, weaker the correlation between two overlay segments, greater is the distance metric between these overlay segments. Accordingly, the distance of overlay segment S3 with overlay segment S4 is 0, since overlay segment S4 is most strongly correlated with overlay segment S3. However, the distance of overlay segment S3 with either of overlay segments S9 and S10 is 3, since overlay segments S9 and S10 have much weaker correlation with overlay segment S3. As described below, existing overlay segments in the main memory that have greater distance values with the requested overlay segment (e.g., their correlations are weaker) have higher eviction priority, compared to existing overlay segments in the main memory that have lower distance values with the requested overlay segment.

The correlation tree 510 (and the correlation distance table 520) shows an example with a limited number of overlay segments and a corresponding limited number of correlation distance values. In some implementations, additional overlay segments and/or distance values (e.g., distance 5, distance 6, among others) are possible. For example, these are cases when the programmer divides the code into a larger number of overlay segments, and/or there are greater number of dependencies between the overlay segments, such that the breath and/or the depth of the correlation tree 510 are greater.

In some implementations, the programmer stores the correlation tree 510 and/or one or more correlation distance tables, e.g., correlation distance table 520, in secondary storage, e.g., in the secondary memory 116, along with the overlay segments. During operation, the correlation tree 510 and/or the correlation distance tables are loaded into main memory, e.g., main memory 114, where the data structures are accessed by the overlay manager. For example, the correlation tree 510 and/or correlation distance tables can be loaded into the resident RAM, e.g., resident 222, of the main memory. However, in some implementations, the overlay manager accesses the correlation tree 510 and/or the correlation distance tables from their respective locations in the secondary storage. As noted previously, in some implementations, the overlay manager dynamically generates correlation distance tables for different overlay segments from the correlation tree 510 on demand. This can be useful to save space in the main memory—only distance tables for overlay segments that are requested are generated.

When using the eviction strategy 500, the overlay manager selects one or more existing overlay segments for eviction from the main memory based on the correlation distance metric. The overlay manager accesses the information in the correlation tree 510 and/or the correlation distance table 520 to identify overlay segments for eviction. For example, when overlay segment S3 is requested by the processor and the overlay manager determines that overlay segment S3 is not present in the main memory, the overlay manager looks up the correlation distance information for overlay segment S3. As described above and also shown by the example entry for overlay segment S3 in the correlation distance table 520 of FIG. 5, the eviction priority for existing overlay segments increases with greater distances from the requested overlay segment S3.

Based on checking the correlation distance information for overlay segment S3, the overlay manager determines that overlay segments S9 and S10 have the highest eviction priority (at distance 3), followed by one of overlay segments S2, S5 and S6 (at distance 2), which are followed by one of overlay segments S1, S7 and S8 (at distance 1), which is finally followed by overlay segment S4 (at distance 0).

The overlay manager checks which of these overlay segments are existing in main memory. The overlay manager first checks whether any of overlay segments S9 and S10 are present in main memory; if so, the overlay manager selects one of S9 or S10 for eviction. If neither of overlay segments S9 and S10 are present in main memory, the overlay manager then checks whether any of overlay segments S2, S5 and S6 are present in main memory; if so, the overlay manager selects one of S2, S5 or S6 for eviction. If none of overlay segments S2, S5 and S6 is present in main memory, the overlay manager then checks whether any of overlay segments S1, S7 and S8 are present in main memory; if so, the overlay manager selects one of S1, S7 and S8 for eviction. Finally, if none of overlay segments S1, S7 and S8 is present in main memory, the overlay manager then checks whether overlay segment S4 is present in main memory; if so, the overlay manager selects S4 for eviction.

Figure 6:
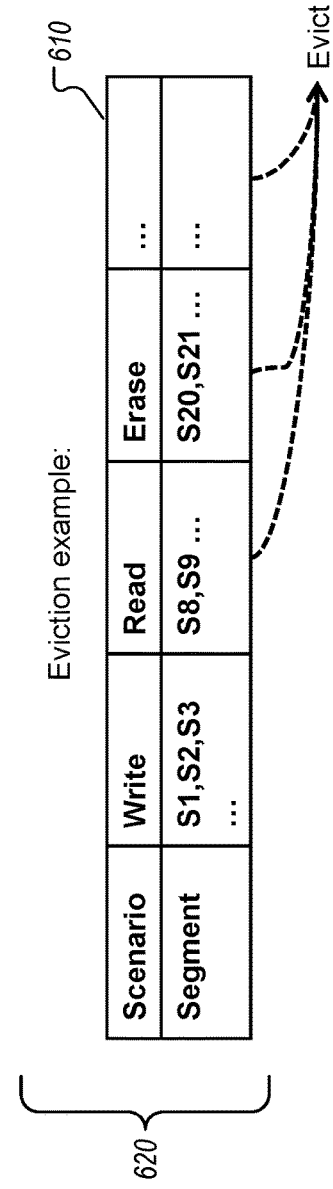
FIG. 6 illustrates an example of an eviction strategy based on generating a scenario table of overlay segments at compile time, according to one or more implementations.

FIG. 6 illustrates an example of an eviction strategy 600 based on generating a scenario table 610 of overlay segments at compile time, according to one or more implementations. In some implementations, the eviction strategy 600 is used by the overlay manager in the system 100. For example, the processor 113 uses the overlay manager service to determine, based on the eviction strategy 600, one or more overlay segments to evict from the main memory 114 to make space available to load, from the secondary memory 116 to the main memory 114, one or more overlay segments corresponding to program code for functions requested by the processor 113. Accordingly, the following sections describe the eviction strategy 600 with respect to the system 100. However, the eviction strategy 600 also can be implemented by other systems and devices.

The scenario table 610 groups different overlay segments into scenarios. In this context, a scenario refers to host behavior, e.g., a group of related operations performed by a processor, such as processor 113, based on commands from a host device, such as host device 120. For example, the processor 113 can perform write operations, read operations, or erase operations for the device 110 based on respective write, read or erase commands from the host device 120. Each of the read, write or erase operations represents a different host behavior or scenario. For example, the device 110 can be an SD card that is coupled to the host device 120. The host device 120 can send a read command that causes the processor 113 to execute a portion of the firmware code to handle the read request from the host. In such cases, the command from the host device 120 can provide a hint for overlay segment loading/eviction by the overlay manager. Accordingly, in such cases, the eviction strategy 600 and the scenario table 610 are based on the behavior of the host device 120.

In some implementations, a programmer divides the firmware code into overlay segments. The programmer groups the overlay segments into different scenarios at compile time, e.g., based on which scenarios call which functions included in the overlay segments. The programmer records the grouping of the overlay segments into different scenarios in the scenario table 610. For example, as shown, the programmer determines that functions included in the overlay segments S1, S2 and S3 are executed by the processor when performing write operations. Accordingly, the programmer groups the overlay segments S1, S2 and S3 as part of the Write scenario. Similarly, the programmer determines that functions included in the overlay segments S8 and S9 are executed by the processor when performing read operations. Accordingly, the programmer groups the overlay segments S8 and S9 as part of the Read scenario. The programmer also determines that functions included in the overlay segments S20 and S21 are executed by the processor when performing erase operations. Accordingly, the programmer groups the overlay segments S20 and S21 as part of the Erase scenario.

The scenario table 610 in the example of FIG. 6 shows a limited number of scenarios and corresponding overlay segments. In some implementations, additional scenarios and/or additional overlay segments are possible. For example, the scenario table 610 can include a Performance Don't Care scenario with one or more overlay segments. Further, each of the Write, Read or Erase scenarios can include other overlay segments.

In some implementations, the programmer stores the scenario table 610 in secondary storage, e.g., the secondary memory 116, along with the overlay segments. During operation, the scenario table 610 is loaded into main memory, e.g., main memory 114, where the data structures are accessed by the overlay manager. For example, the scenario table 610 can be loaded into the resident RAM, e.g., resident RAM 222, of the main memory. However, in some implementations, the overlay manager accesses the scenario table 610 from its location in the secondary storage.

When using the eviction strategy 600, the overlay manager selects one or more existing overlay segments for eviction from the main memory based on the scenario table 610. The overlay manager monitors one or more operations that are presently performed by the processor, and accordingly determines the current scenario. For example, if the processor 113 performs a write operation, the overlay manager assumes that the current scenario is the Write scenario. In some implementations, the overlay manager records the current scenario, e.g., as a parameter, in the main memory.

When removing an existing overlay segment from the main memory, the overlay manager checks the scenario table 610 to determine which overlay segments belong to the current scenario. Using this information, the overlay manager evicts one or more overlay segments that do not belong to the current scenario. The example 620 of FIG. 6 provides an eviction example, e.g., when the current scenario is write. Considering the example 620, the overlay manager determines, in the manner described above, that the current scenario is the Write scenario. By checking the scenario table 610, the overlay manager identifies that overlay segments S1, S3 and S3 belong to the Write scenario; overlay segments S8 and S9 belong to the Read scenario; and overlay segments S20 and S21 belong to the Erase scenario.

Accordingly, to evict an existing overlay segment from the main memory when the current scenario is the Write scenario, the overlay manager selects an overlay segment that belongs to one of the other scenarios, e.g., the Read or Erase scenarios, among others. The overlay manager first checks whether any of overlay segments belonging to the Read scenario, e.g., overlay segments S8 or S9, or any of the overlay segments belonging to the Erase scenario, e.g., overlay segments S20 or S21, are present in main memory. If one or more of overlay segments S8, S9, S20 or S21 are present in the main memory, the overlay manager selects one of these overlay segments for eviction.

In some implementations, if more than one of the overlay segments S8, S9, S20 or S21 are present in the main memory, then the overlay manager applies another eviction strategy, e.g., the load frequency eviction strategy 300, the correlation table eviction strategy 400 or the correlation distance eviction strategy 500, to select one of overlay segments S8, S9, S20 or S21 for eviction. For example, in some implementations, the overlay manager first identifies the overlay segments S8, S9, S20 or S21 for eviction based on the scenario table 610. Then the overlay manager accesses the correlation tree 510 to determine the correlation distances of the overlay segments S8, S9, S20 or S21 with the requested overlay segment that is to be loaded. Using the information from the correlation tree 510, the overlay manager selects one of overlay segments S8, S9, S20 or S21 that has the largest distance with the requested overlay segment, and therefore the highest eviction priority.

Figure 7:
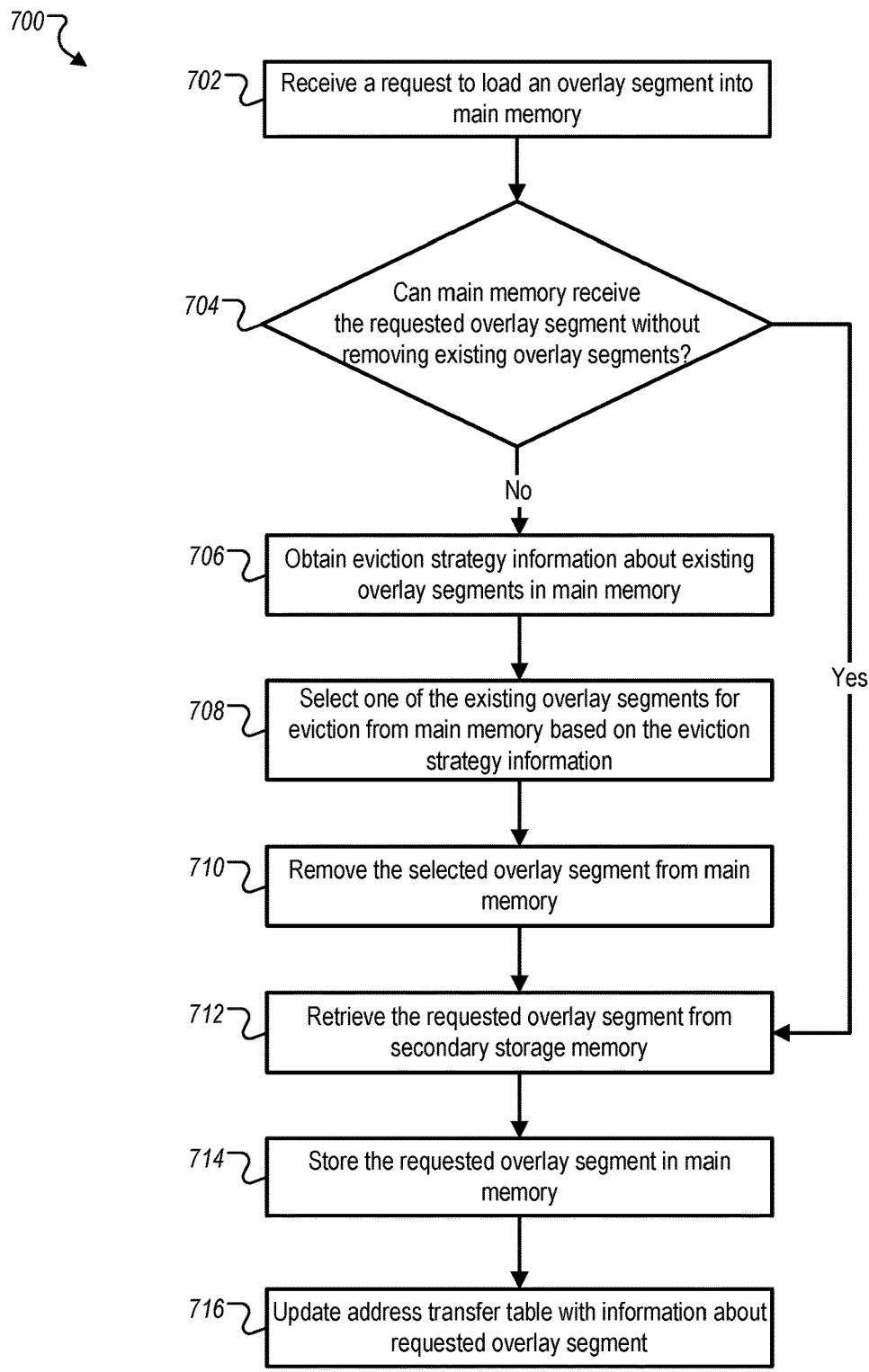
FIG. 7 illustrates an example of a process to evict an existing overlay segment from main memory, according to one or more implementations.

FIG. 7 illustrates an example of a process 700 to evict an existing overlay segment from main memory, according to one or more implementations. In some implementations, the process 700 is performed by the processor using overlay manager service when triggered by an interrupt from the address transfer HW, e.g., upon an address miss. When the interrupt is triggered, the processor 113 uses the overlay manager service to implement the process 700 for loading one or more overlay segments from the secondary memory 116 into the main memory 114. Accordingly, the following sections describe the process 700 with respect to the system 100. However, in other implementations, the process 700 may be performed by other devices or systems.

At 702, a request is received to load an overlay segment into main memory. For example, foreground operations performed by the processor 113 attempts to access an overlay segment from an address in the virtual overlay RAM address space 244. The address transfer HW, e.g., address transfer HW 230, monitors accesses to the virtual overlay RAM address space 244. When the address transfer HW 230 detects the attempt by the processor 113 to access the overlay segment in the virtual overlay RAM address space 244, the address transfer HW 230 looks up the entries in the address transfer table, e.g., address transfer table 232, and determines that the requested overlay segment is not present in an overlay slot in the main memory 114. The address transfer HW accordingly generates an address miss interrupt. Following the address miss interrupt, the processor 113 executes the routines corresponding to the overlay manager, which proceeds to load the requested overlay segment from the secondary memory 116 into the main memory 114.

At 704, a determination is made whether the main memory can receive the requested overlay segment without removing existing overlay segments. For example, the overlay manager checks to see if there is space available in the main memory 114 (e.g., in the overlay RAM section of the main memory) to load the requested overlay segment.

If a determination is made at 704 that the main memory cannot receive the requested overlay segment without removing existing overlay segments, then at 706, eviction strategy information about one or more existing overlay segments present in the main memory are obtained. For example, if the overlay manager determines that all overlay segment slots in the main memory 114 are occupied by existing overlay segments, then the overlay manager proceeds to select an existing overlay segment for eviction from the main memory 114 to make space available to load the requested overlay segment.

To select an existing overlay segment for eviction, the overlay manager obtains eviction strategy information about the existing overlay segments. In some implementations, the overlay manager obtains eviction strategy information using the eviction strategy 300, which is based on dynamically determining load frequencies of overlay segments, as described previously. In some implementations, the overlay manager obtains eviction strategy information using the eviction strategy 400, which is based on dynamically determining correlations among the overlay segments, as described previously. In some implementations, the overlay manager obtains eviction strategy information using the eviction strategy 500, which is based on using a correlation data structure that is statically determined at compile time of the firmware code, as described previously. In some implementations, the overlay manager obtains eviction strategy information using the eviction strategy 600, which is based on using a scenario table that is statically determined at compile time of the firmware code, as described previously.

At 708, one of the existing overlay segments is selected for eviction from the main memory based on the eviction strategy information. For example, in some implementations, upon using the eviction strategy 300, the overlay manager identifies and selects an existing overlay segment that corresponds to the lowest load frequency. In some implementations, by constructing the correlation table 410 in the eviction strategy 400, the overlay manager identifies and selects an existing overlay segment that is not correlated with the requested overlay segment. In some implementations, by accessing the correlation tree 510 in the eviction strategy 500, the overlay manager identifies and selects an existing overlay segment that has the largest distance with the requested overlay segment (and therefore, the highest eviction priority). In some implementations, by monitoring the current scenario based on processor operations and upon accessing the scenario table 610 in the eviction strategy 600, the overlay manager identifies and selects an existing overlay segment that does not belong to the current scenario.

At 710, the selected overlay segment is removed from main memory. For example, upon selecting an existing overlay segment at 708, the overlay manager deletes the selected overlay segment from the main memory 114. Accordingly, the overlay slot that was previously occupied by the selected overlay segment is now available to load the requested overlay segment.

Upon making space available in main memory by removing the selected overlay segment, or if a determination is made at 704 that the main memory can receive the requested overlay segment without removing existing overlay segments, then at 712 the requested overlay segment is retrieved from the secondary storage memory. For example, if the overlay manager determines that there is space available in the main memory 114, or following removing an existing overlay segment from main memory 114 to make space available when the main memory 114 is otherwise full, the overlay manager accesses the requested overlay segment from its stored location in the secondary memory 116 (e.g., from a location in the overlay section of the secondary memory 116).

At 714, the requested overlay segment is stored in the main memory. For example, upon retrieving the requested overlay segment from its stored location in the secondary memory 116, the overlay manager writes the requested overlay segment to an available slot in the main memory 114. As described above, in some implementations, the overlay slot is made available by removing an existing overlay segment from main memory 114, e.g., when the overlay RAM of the main memory 114 is otherwise fully occupied by overlay segments. In other implementations, the overlay slot is available without removing an existing overlay segment from main memory 114, e.g., when the overlay RAM of the main memory 114 is not otherwise fully occupied by overlay segments.

At 716, the address transfer table is updated with information about the requested overlay segment. For example, after the overlay manager retrieves the requested overlay segment from the secondary memory and loads into the selected overlay slot in the main memory, the overlay manager updates the entry in the address transfer table 232 corresponding to the overlay slot to record the overlay segment that is now stored in the overlay slot. The address miss interrupt is subsequently cleared, and the processor can access the requested address from the corresponding overlay segment that is now loaded into the main memory.

In the above manner, the processor 113 uses the overlay manager service to efficiently load, in conjunction with the address transfer HW, a requested overlay segment into the main memory 114 following the process 700. In some implementations, as described in the following sections, the overlay manager obtains eviction strategy information from multiple eviction strategies at 706. In such cases, the overlay manager selects one of the existing overlay segments for eviction at 708 based on a combination of the eviction strategy information obtained from the multiple eviction strategies.

Figure 8:
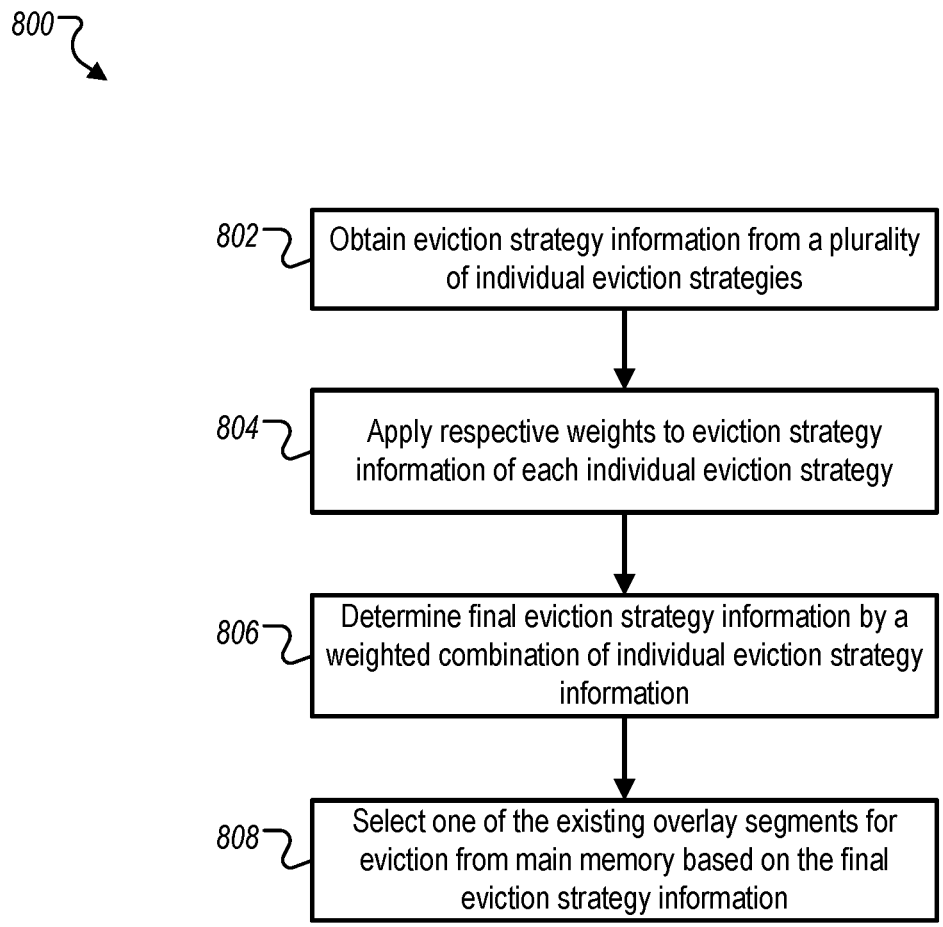
FIG. 8 illustrates an example of a process to select an existing overlay segment for eviction from main memory based on combining results of multiple eviction strategies, according to one or more implementations.

FIG. 8 illustrates an example of a process 800 to select an existing overlay segment for eviction from main memory based on combining results of multiple eviction strategies, according to one or more implementations. In some implementations, the process 800 is performed by the processor 113 using the functions of the overlay manager. For example, the processor 113 uses the overlay manager service to determine, based on combining two or more of the eviction strategies 300, 400, 500 and 600, one or more overlay segments to evict from the main memory 114 to make space available to load one or more requested overlay segments. In some implementations, the processor performs the process 800 as part of 706 and 708 in the process 700. Accordingly, the following sections describe the process 800 with respect to the system 100. However, in other implementations, the process 800 may be performed by other systems or devices.

At 802, eviction strategy information are obtained from a plurality of individual eviction strategies. For example, the overlay manager obtains eviction strategy information individually from two or more of the eviction strategies 300, 400, 500 and 600 as described in previously.

At 804, respective weights are applied to eviction strategy information of each individual eviction strategy. For example, in some implementations, the overlay manager obtains eviction strategy information for each of the eviction strategies 300, 400, 500 and 600. The overlay manager applies a first weighting value to the eviction strategy information for the eviction strategy 300; a second weighting value to the eviction strategy information for the eviction strategy 400; a third weighting value to the eviction strategy information for the eviction strategy 500; and a fourth weighting value to the eviction strategy information for the eviction strategy 600.

In some implementations, each of the first, second, third and fourth weighting values, or weights, are determined by the programmer. For example, the programmer assigns the different weights to the respective eviction strategies, and writes the weights as system parameters in secondary memory 116. During run time, the weights are accessed by the device controller 112.

In some implementations, the overlay manager dynamically determines the weights. For example, during run time, the overlay manager assigns initial default weights to each of the eviction strategies. The weights are stored in the main memory 114, e.g., in the resident RAM of the main memory as system parameters. As the overlay manager uses the eviction strategy information from the different eviction strategies during operation, it adjusts the weights depending on the accuracy of eviction strategy information. For example, the use of eviction strategy information of a first eviction strategy can lead to evicting an existing overlay segment that is requested by the processor shortly thereafter. Since the overlay segment now has to be reloaded into the main memory, this can cause inefficient operation. In such cases, the weight assigned to the first eviction strategy is reduced, such that the information of the first eviction strategy is given less importance in computing the final eviction strategy information. On the other hand, the use of eviction strategy information of a second eviction strategy can lead to better selection of an existing overlay segment for eviction, e.g., an overlay segment that is not requested by the processor shortly thereafter. This can improve the efficiency of the eviction operations. In such cases, the weight assigned to the second eviction strategy is increased, such that the information of the second eviction strategy is given more importance in computing the final eviction strategy information.

At 806, a final eviction strategy information is determined by a weighted combination of the individual eviction strategy information. For example, the overlay manager combines the individual eviction strategy information obtained from two or more of the eviction strategies 300, 400, 500 and 600. In performing the combination, the overlay manager applies the respective weights to the individual eviction strategy information to reflect the relative importance placed on the results from the various eviction strategies. Accordingly, the final eviction strategy information is a weighted combination of the individual eviction strategy information obtained from two or more of the eviction strategies 300, 400, 500 and 600.

At 808, one of the existing overlay segments is selected for eviction from the main memory based on the final eviction strategy information. For example, the overlay manager identifies and selects an existing overlay segment based on applying the weighted combination of the individual eviction strategy information that are obtained from two or more of the eviction strategies 300, 400, 500 and 600. In this manner, the processor 113, using the overlay manager service, evicts an overlay segment by considering the information provided by multiple eviction strategies.

The disclosed and other examples can be implemented as one or more computer program products, for example, one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for operating a memory system, the method comprising:
   receiving a request to load a particular overlay segment from a secondary storage memory to a main memory for execution by a processor, wherein the particular overlay segment is absent from the main memory;
   determining whether the main memory can receive the particular overlay segment;
   in response to determining that the main memory cannot receive the particular overlay segment:
      obtaining eviction strategy information about one or more existing overlay segments that are present in the main memory, wherein the eviction strategy information includes determining a load frequency of overlay segments into the main memory, comprising:
         for each of the one or more existing overlay segments, storing a load time instant at which the respective existing overlay segment was loaded into main memory from the secondary storage memory at an instance preceding the most recent instance of loading the respective existing overlay segment into the main memory, wherein the respective overlay segment is loaded into main memory at least twice,
         storing a request time instant at which the request to load the particular overlay segment is received,
         for each of the one or more existing overlay segments, computing a difference between the load time instant corresponding to the respective existing overlay segment and the request time instant,
         determining a load frequency as inversely proportional to the difference, and
         identifying an existing overlay segment of the one or more existing overlay segments with the lowest load frequency;
      based on the eviction strategy information about the one or more existing overlay segments, selecting the existing overlay segment with the lowest load frequency for eviction from the main memory;
   retrieving the particular overlay segment from the secondary storage memory; and
   replacing the selected existing overlay segment in the main memory with the particular overlay segment.

2. The method of claim 1, wherein obtaining eviction strategy information about the one or more existing overlay segments further comprises obtaining scenario data for a plurality of overlay segments present in the secondary storage memory, the method comprising:
   obtaining, from the secondary storage memory, a scenario data structure identifying task scenarios included in a program corresponding to the plurality of overlay segments and associations of the plurality of overlay segments with the task scenarios;
   determining a particular task scenario associated with the particular overlay segment;
   identifying an existing overlay segment present in the main memory that is not associated with the particular task scenario; and
   selecting the identified existing overlay segment for eviction from the main memory.

3. The method of claim 1, wherein determining whether the main memory can receive the particular overlay segment comprises determining whether the main memory is full.

4. The method of claim 1, further comprising:
   predicting, based on the eviction strategy information about the one or more existing overlay segments, a next overlay segment that will be executed by the processor.

5. A method for operating a memory system, the method comprising:
   receiving a request to load a particular overlay segment from a secondary storage memory to a main memory for execution by a processor, wherein the particular overlay segment is absent from the main memory;
   determining whether the main memory can receive the particular overlay segment;
   in response to determining that the main memory cannot receive the particular overlay segment:
   obtaining eviction strategy information about one or more existing overlay segments that are present in the main memory, wherein obtaining eviction strategy information about the one or more existing overlay segments comprises maintaining correlation data for overlay segments as they are loaded into the main memory, comprising:
      generating a first entry for a first overlay segment in a correlation data structure at a time the first overlay segment is loaded into the main memory from the secondary storage memory, wherein the correlation data structure includes one or more entries for one or more overlay segments,
      determining one or more other overlay segments that are correlated to the first overlay segment, and
      in response to the determination, linking the one or more other overlay segments to the first entry;
   based on the eviction strategy information about the one or more existing overlay segments, selecting at least one of the one or more existing overlay segments for eviction from the main memory;
   retrieving the particular overlay segment from the secondary storage memory; and replacing the selected at least one of the one or more existing overlay segments in the main memory with the particular overlay segment.

6. The method of claim 5, further comprising:
in response to determining that the main memory cannot accept the particular overlay segment, accessing the correlation data structure;
determining whether a target entry corresponding to the particular overlay segment exists in the correlation data structure;
conditioned on determining that the target entry corresponding to the particular overlay segment exists in the correlation data structure:
examining the target entry to identify one or more overlay segments that are correlated with the particular overlay segment;
based on identifying one or more overlay segments that are correlated with the particular overlay segment, determining an existing overlay segment present in the main memory that is not correlated with the particular overlay segment; and
in response to determining an existing overlay segment that is not correlated with the particular overlay segment, selecting the existing overlay segment for eviction from the main memory.

7. The method of claim 5, wherein determining one or more other overlay segments that are correlated to the first overlay segment comprises:
identifying a second overlay segment that is loaded into the main memory from the secondary storage memory within a preselected time period following loading the first overlay segment into the main memory from the secondary storage memory; and
based on identifying the second overlay segment that is loaded within the preselected time period following loading the first overlay segment, correlating the second overlay segment to the first overlay segment.

8. A method for operating a memory system, the method comprising:
receiving a request to load a particular overlay segment from a secondary storage memory to a main memory for execution by a processor, wherein the particular overlay segment is absent from the main memory;
determining whether the main memory can receive the particular overlay segment;
in response to determining that the main memory cannot receive the particular overlay segment:
obtaining eviction strategy information about one or more existing overlay segments that are present in the main memory, wherein obtaining eviction strategy information about the one or more existing overlay segments comprises obtaining correlation data for a plurality of overlay segments present in the secondary storage memory, comprising:
obtaining, from the secondary storage memory, a correlation data structure indicating correlations among the plurality of overlay segments,
computing, based on the correlation data structure, correlation distances between the particular overlay segment and one or more other overlay segments in the correlation data structure,
upon computing the correlation distances, identifying an overlay segment with the largest correlation distance among the one or more existing overlay segments present in the main memory, and
selecting the identified overlay segment for eviction from the main memory;

retrieving the particular overlay segment from the secondary storage memory; and
replacing the selected overlay segment in the main memory with the particular overlay segment.

9. A method for operating a memory system, the method comprising:
receiving a request to load a particular overlay segment from a secondary storage memory to a main memory for execution by a processor, wherein the particular overlay segment is absent from the main memory;
determining whether the main memory can receive the particular overlay segment;
in response to determining that the main memory cannot receive the particular overlay segment:
obtaining eviction strategy information about one or more existing overlay segments that are present in the main memory, wherein obtaining eviction strategy information about the one or more existing overlay segments comprises obtaining at least a first eviction strategy information and a second eviction strategy information about the one or more existing overlay segments, further comprising:
associating a first weight with the first eviction strategy information and a second weight with the second eviction strategy information,
identifying a first group of the one or more existing overlay segments for eviction based on the first eviction strategy information,
weighting the first group using the first weight,
identifying a second group of the one or more existing overlay segments for eviction based on the second eviction strategy information,
weighting the second group using the second weight,
computing an eviction priority order for the one or more existing overlay segments based on a combination of the weighted first group and the weighted second group, and
selecting an existing overlay segment for eviction from the main memory based on the eviction priority order;
based on the eviction strategy information about the one or more existing overlay segments, selecting at least one of the one or more existing overlay segments for eviction from the main memory;
retrieving the particular overlay segment from the secondary storage memory; and
replacing the selected at least one of the one or more existing overlay segments in the main memory with the particular overlay segment.

10. A memory system comprising:
a secondary storage memory that is configured to store a plurality of overlay segments;
a main memory that is configured to store, for execution by a processor at run time, one or more overlay segments obtained from the plurality of overlay segments stored in the secondary storage memory; and
an overlay manager that is configured to:
receive a request to load a particular overlay segment from the secondary storage memory to the main memory for execution by the processor, wherein the particular overlay segment is absent from the main memory;
determine whether the main memory can receive the particular overlay segment;
in response to determining that the main memory cannot receive the particular overlay segment:

obtain eviction strategy information about one or more existing overlay segments that are present in the main memory, wherein the eviction strategy information includes determining a load frequency of overlay segments into the main memory, comprising:
  for each of the one or more existing overlay segments, storing a load time instant at which the respective existing overlay segment was loaded into main memory from the secondary storage memory at an instance preceding the most recent instance of loading the respective existing overlay segment into the main memory, wherein the respective overlay segment is loaded into main memory at least twice,
  storing a request time instant at which the request to load the particular overlay segment is received,
    for each of the one or more existing overlay segments, computing a difference between the load time instant corresponding to the respective existing overlay segment and the request time instant,
    determining a load frequency as inversely proportional to the difference, and
    identifying an existing overlay segment of the one or more existing overlay segments with the lowest load frequency;
  based on the eviction strategy information about the one or more existing overlay segments, select the existing overlay segment with the lowest load frequency for eviction from the main memory;
  retrieve the particular overlay segment from the secondary storage memory; and
  replace the selected existing overlay segment in the main memory with the particular overlay segment.

11. The memory system of claim 10, wherein obtaining eviction strategy information about the one or more existing overlay segments further comprises obtaining scenario data for a plurality of overlay segments present in the secondary storage memory, and wherein the overlay manager is configured to:
  obtain, from the secondary storage memory, a scenario data structure identifying task scenarios included in a program corresponding to the plurality of overlay segments and associations of the plurality of overlay segments with the task scenarios;
  determine a particular task scenario associated with the particular overlay segment;
  identify an existing overlay segment present in the main memory that is not associated with the particular task scenario; and
  select the identified existing overlay segment for eviction from the main memory.

12. The memory system of claim 10, wherein determining whether the main memory can receive the particular overlay segment comprises determining whether the main memory is full.

13. The memory system of claim 10, wherein a size of an overlay segment corresponds to a size of an address transfer hardware unit.

14. A memory system comprising:
  a secondary storage memory that is configured to store a plurality of overlay segments;
  a main memory that is configured to store, for execution by a processor at run time, one or more overlay segments obtained from the plurality of overlay segments stored in the secondary storage memory; and
  an overlay manager that is configured to:
    receive a request to load a particular overlay segment from the secondary storage memory to the main memory for execution by the processor, wherein the particular overlay segment is absent from the main memory;
    determine whether the main memory can receive the particular overlay segment;
    in response to determining that the main memory cannot receive the particular overlay segment:
    obtain eviction strategy information about one or more existing overlay segments that are present in the main memory, wherein obtaining eviction strategy information about the one or more existing overlay segments comprises maintaining correlation data for overlay segments as they are loaded into the main memory, including:
      generating a first entry for a first overlay segment in a correlation data structure at a time the first overlay segment is loaded into the main memory from the secondary storage memory, wherein the correlation data structure includes one or more entries for one or more overlay segments,
      determining one or more other overlay segments that are correlated to the first overlay segment, and
      in response to the determination, linking the one or more other overlay segments to the first entry;
    based on the eviction strategy information about the one or more existing overlay segments, select at least one of the one or more existing overlay segments for eviction from the main memory;
    retrieve the particular overlay segment from the secondary storage memory; and
    replace the selected at least one of the one or more existing overlay segments in the main memory with the particular overlay segment.

15. The memory system of claim 14, wherein the overlay manager is further configured to:
  in response to determining that the main memory cannot accept the particular overlay segment, access the correlation data structure;
  determine whether a target entry corresponding to the particular overlay segment exists in the correlation data structure;
  conditioned on determining that the target entry corresponding to the particular overlay segment exists in the correlation data structure:
    examine the target entry to identify one or more overlay segments that are correlated with the particular overlay segment;
    based on identifying one or more overlay segments that are correlated with the particular overlay segment, determine an existing overlay segment present in the main memory that is not correlated with the particular overlay segment; and
    in response to determining an existing overlay segment that is not correlated with the particular overlay segment, select the existing overlay segment for eviction from the main memory.

16. The memory system of claim 14, wherein determining one or more other overlay segments that are correlated to the first overlay segment comprises:
  identifying a second overlay segment that is loaded into the main memory from the secondary storage memory within a preselected time period following loading the first overlay segment into the main memory from the secondary storage memory; and based on identifying the second overlay segment that is loaded within the preselected time period following loading the first overlay segment, correlating the second overlay segment to the first overlay segment.

17. A memory system comprising:

a secondary storage memory that is configured to store a plurality of overlay segments;

a main memory that is configured to store, for execution by a processor at run time, one or more overlay segments obtained from the plurality of overlay segments stored in the secondary storage memory; and an overlay manager that is configured to:
receive a request to load a particular overlay segment from the secondary storage memory to the main memory for execution by the processor, wherein the particular overlay segment is absent from the main memory;
determine whether the main memory can receive the particular overlay segment;
in response to determining that the main memory cannot receive the particular overlay segment:
obtain eviction strategy information about one or more existing overlay segments that are present in the main memory, wherein obtaining eviction strategy information about the one or more existing overlay segments comprises obtaining correlation data for a plurality of overlay segments present in the secondary storage memory, including:
obtaining, from the secondary storage memory, a correlation data structure indicating correlations among the plurality of overlay segments,
computing, based on the correlation data structure, correlation distances between the particular overlay segment and one or more other overlay segments in the correlation data structure,
upon computing the correlation distances, identifying an overlay segment with the largest correlation distance among the one or more existing overlay segments present in the main memory, and
selecting the identified overlay segment for eviction from the main memory;
retrieve the particular overlay segment from the secondary storage memory; and
replace the selected overlay segment in the main memory with the particular overlay segment.

18. A memory system comprising:

a secondary storage memory that is configured to store a plurality of overlay segments;

a main memory that is configured to store, for execution by a processor at run time, one or more overlay segments obtained from the plurality of overlay segments stored in the secondary storage memory; and an overlay manager that is configured to:
receive a request to load a particular overlay segment from the secondary storage memory to the main memory for execution by the processor, wherein the particular overlay segment is absent from the main memory;
determine whether the main memory can receive the particular overlay segment;
in response to determining that the main memory cannot receive the particular overlay segment:
obtain eviction strategy information about one or more existing overlay segments that are present in the main memory, wherein obtaining eviction strategy information about the one or more existing overlay segments comprises obtaining at least a first eviction strategy information and a second eviction strategy information about the one or more existing overlay segments, further comprising:
associating a first weight with the first eviction strategy information and a second weight with the second eviction strategy information,
identifying a first group of the one or more existing overlay segments for eviction based on the first eviction strategy information,
weighting the first group using the first weight,
identifying a second group of the one or more existing overlay segments for eviction based on the second eviction strategy information,
weighting the second group using the second weight,
computing an eviction priority order for the one or more existing overlay segments based on a combination of the weighted first group and the weighted second group, and
selecting an existing overlay segment for eviction from the main memory based on the eviction priority order;
based on the eviction strategy information about the one or more existing overlay segments, select at least one of the one or more existing overlay segments for eviction from the main memory;
retrieve the particular overlay segment from the secondary storage memory; and
replace the selected at least one of the one or more existing overlay segments in the main memory with the particular overlay segment.

* * * * *